(12) United States Patent
Ketchpaw et al.

(10) Patent No.: US 10,628,851 B2
(45) Date of Patent: Apr. 21, 2020

(54) ANALYZING AND CONVERTING UNSTRUCTURED NETWORKING SYSTEM COMMUNICATIONS

(71) Applicant: Facebook, Inc., Menlo Park, CA (US)

(72) Inventors: John Stephen Ketchpaw, Seattle, WA (US); Dan Barak, Redwood City, CA (US); Dean Jackson, Seattle, WA (US); James F. Geist, Jr., Issaquah, WA (US)

(73) Assignee: FACEBOOK, INC., Menlo Park, CA (US)

( * ) Notice: Subject to any disclaimer, the term of this patent is extended or adjusted under 35 U.S.C. 154(b) by 547 days.

(21) Appl. No.: 15/394,482

(22) Filed: Dec. 29, 2016

(65) Prior Publication Data
US 2018/0189827 A1    Jul. 5, 2018

(51) Int. Cl.
*G06Q 30/00* (2012.01)
*G06Q 30/02* (2012.01)
*G06N 20/00* (2019.01)

(52) U.S. Cl.
CPC ......... *G06Q 30/0254* (2013.01); *G06N 20/00* (2019.01); *G06Q 30/0242* (2013.01); *G06Q 30/0271* (2013.01); *G06Q 30/0276* (2013.01); *G06Q 30/0277* (2013.01)

(58) Field of Classification Search
CPC . G06Q 30/0254; G06Q 30/0277; G06N 20/00
USPC ............................................ 705/14.72, 14.73
See application file for complete search history.

(56) References Cited

U.S. PATENT DOCUMENTS

| | | | | |
|---|---|---|---|---|
| 7,562,048 B1* | 7/2009 | Sunde | ................... | G06Q 20/204 705/38 |
| 2008/0189169 A1* | 8/2008 | Turpin | ................... | G06Q 30/02 705/7.33 |
| 2014/0089133 A1* | 3/2014 | Argue | ................ | G06Q 30/0282 705/26.7 |
| 2014/0278985 A1* | 9/2014 | Ramakrishnan | ... | G06Q 30/0256 705/14.54 |
| 2014/0316927 A1* | 10/2014 | Ganesan | ............ | G06Q 30/0611 705/26.4 |
| 2014/0317228 A1* | 10/2014 | Dharmasanam | ........ | H04L 43/12 709/217 |
| 2014/0365305 A1* | 12/2014 | Arditi | ................ | G06Q 30/0269 705/14.58 |
| 2015/0100416 A1* | 4/2015 | Blackhurst | ......... | G06Q 30/0253 705/14.51 |
| 2015/0149353 A1* | 5/2015 | Linden | ................... | G06Q 20/28 705/41 |

(Continued)

*Primary Examiner* — Luis A Brown
(74) *Attorney, Agent, or Firm* — Keller Jolley Preece

(57) ABSTRACT

The present disclosure is directed toward systems and methods for identifying offers in networking system post. For example, systems and methods described herein identify one or more offer indicators in a networking system post and calculate a confidence score representing a level of confidence that the unstructured networking system post includes a merchant offer. In response to calculating a confidence score above a threshold value, systems and methods described herein prompt the composer of the unstructured post to convert the post into a structured offer. Upon converting the unstructured post into a structured offer, systems and methods described herein intelligently distribute the structured offer for use by networking system users.

20 Claims, 10 Drawing Sheets

(56) References Cited

U.S. PATENT DOCUMENTS

| | | | |
|---|---|---|---|
| 2015/0161673 A1* | 6/2015 | Guo | G06O 30/0269 |
| | | | 705/14.66 |
| 2016/0042069 A1* | 2/2016 | Lee-Goldman | G06F 16/951 |
| | | | 707/706 |
| 2016/0189214 A1* | 6/2016 | Dai | G06Q 30/0255 |
| | | | 705/14.53 |
| 2017/0161794 A1* | 6/2017 | Zhu | G06Q 30/02 |
| 2017/0171195 A1* | 6/2017 | Chang | G06F 21/32 |
| 2017/0262900 A1* | 9/2017 | Ramachandran | G06Q 10/067 |
| 2019/0005539 A1* | 1/2019 | Pitinga | G06Q 30/0255 |

* cited by examiner

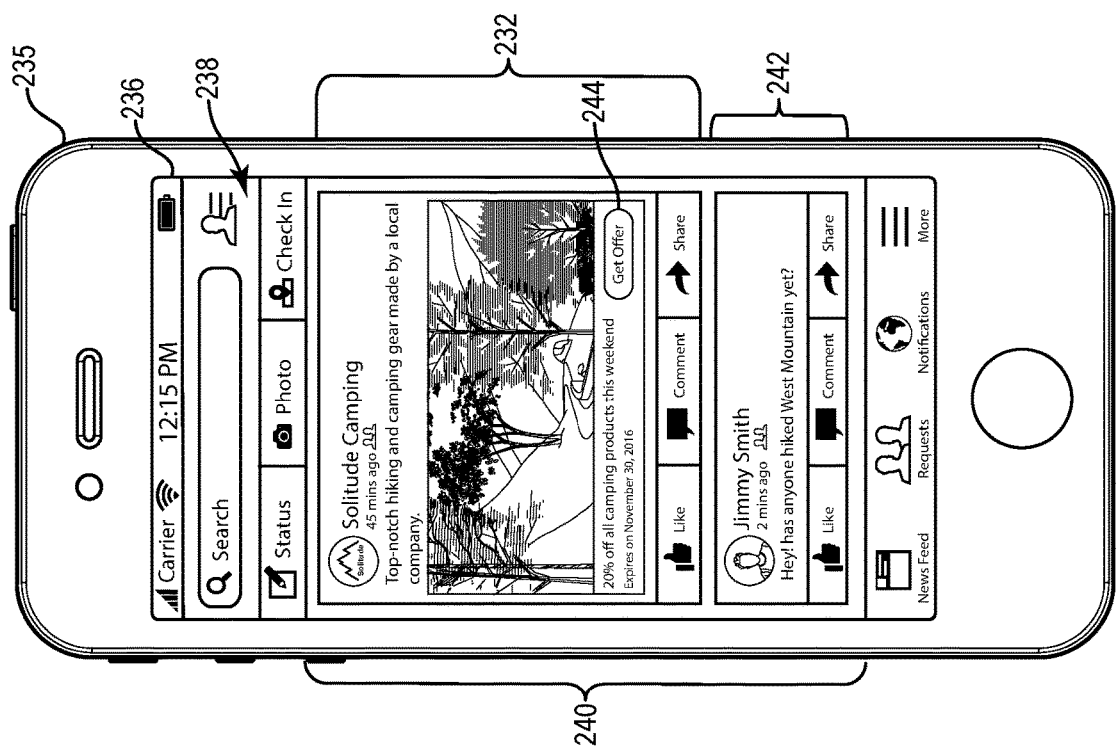

ANALYZING AND CONVERTING UNSTRUCTURED NETWORKING SYSTEM COMMUNICATIONS

BACKGROUND

Merchants find it increasingly effective to make various offers available in certain online forums. For example, a merchant (e.g., a provider of some good or service) may make offers available to users via a networking system. To illustrate, the merchant may have a social networking profile and corresponding profile page on a networking system. The merchant can use the networking system to compose a post and share the post with other users of the networking system (e.g., users who have "liked" or who "follow" the merchant's profile page). Among other things, the merchant can use a social networking post to share information regarding a particular offer or promotion available from the merchant. The networking system can then distribute the post, including the offer or promotion information, to users by adding the post to the users' newsfeeds, for example.

Although sharing information in this way can be somewhat effective in promoting a merchant's goods or services, it is often inefficient and fails to leverage the various resources and features available for promoting products through a networking system. For example, networking systems typically make no distinction between a standard post including an offer (e.g., a special promotion) and any other standard social networking post. As a result, the networking system typically only distributes the merchant's post to users that are already familiar with the merchant (e.g., users that have "liked" or "followed" the merchant on the networking system). Accordingly, if the merchant uses standard post functionality, the resulting post is inherently limited in the audience it reaches, and may not reach many users that would be interested in the merchant's offer. In addition, the merchant's standard posts are easily lost among all the other standard posts included in a networking system user's newsfeed. As a result of the foregoing, a merchant's sales and exposure on the networking system are inherently limited.

Furthermore, by providing offers to networking system users via standard networking system posts, the merchant generally receives no further information regarding the effectiveness of the provided offer. For example, although a merchant may be notified of likes, comments, and shares received by the post, the merchant has only circumstantial data to indicate whether the post was successful in leading to sales of the merchant's product being offered. Thus, the merchant is unable to accurately determine a conversion rate or a click rate for the provided offer.

Additionally, by providing offers within standard networking system posts, the merchant misses out on more robust tools that the networking system makes available to merchants. For example, in one or more embodiments, the networking system offers tools that allow merchants to target audiences, track offer usage, and further promote the offers within the networking system. The merchant, however, cannot utilize or benefit from these tools when the merchant's offers are only shared by way of standard social networking posts.

As such, a number of disadvantages exist with conventional methods and systems for promoting offers using a networking system.

SUMMARY

One or more embodiments described herein provide benefits and/or solve one or more of the foregoing or other problems in the art with systems and methods for promoting offers through social networking posts or other networking system communication. For example, the systems and methods described herein provide various features for converting a standard, unstructured post/communication into a structured offer. In some embodiments, the disclosed system detects a composition of an unstructured social networking post. The system then analyzes the unstructured social networking post to generate a confidence score indicating a confidence that the unstructured social networking post includes an offer. Based on the generated confidence score (e.g., if the generated confidence score satisfies a predetermined threshold), the system provides a prompt to convert the unstructured social networking post into a structured offer. Upon converting the unstructured social networking post to a structured offer, the system can utilize the structured offer to, among other things, promote the offer within the networking system, facilitate management of the offer, and provide feedback on the reach and effectiveness of the offer.

Additional features and advantages of the present application will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features can be obtained, a more particular description of the aspects of one or more embodiments briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered limiting of scope, one or more embodiments will be described and explained with additional specificity and detail through the use of the accompanying drawings in which:

FIGS. 2A-2D illustrate a series of graphical user interfaces illustrating features of the offer management system in accordance with one or more embodiments;

DETAILED DESCRIPTION

Figure 1:
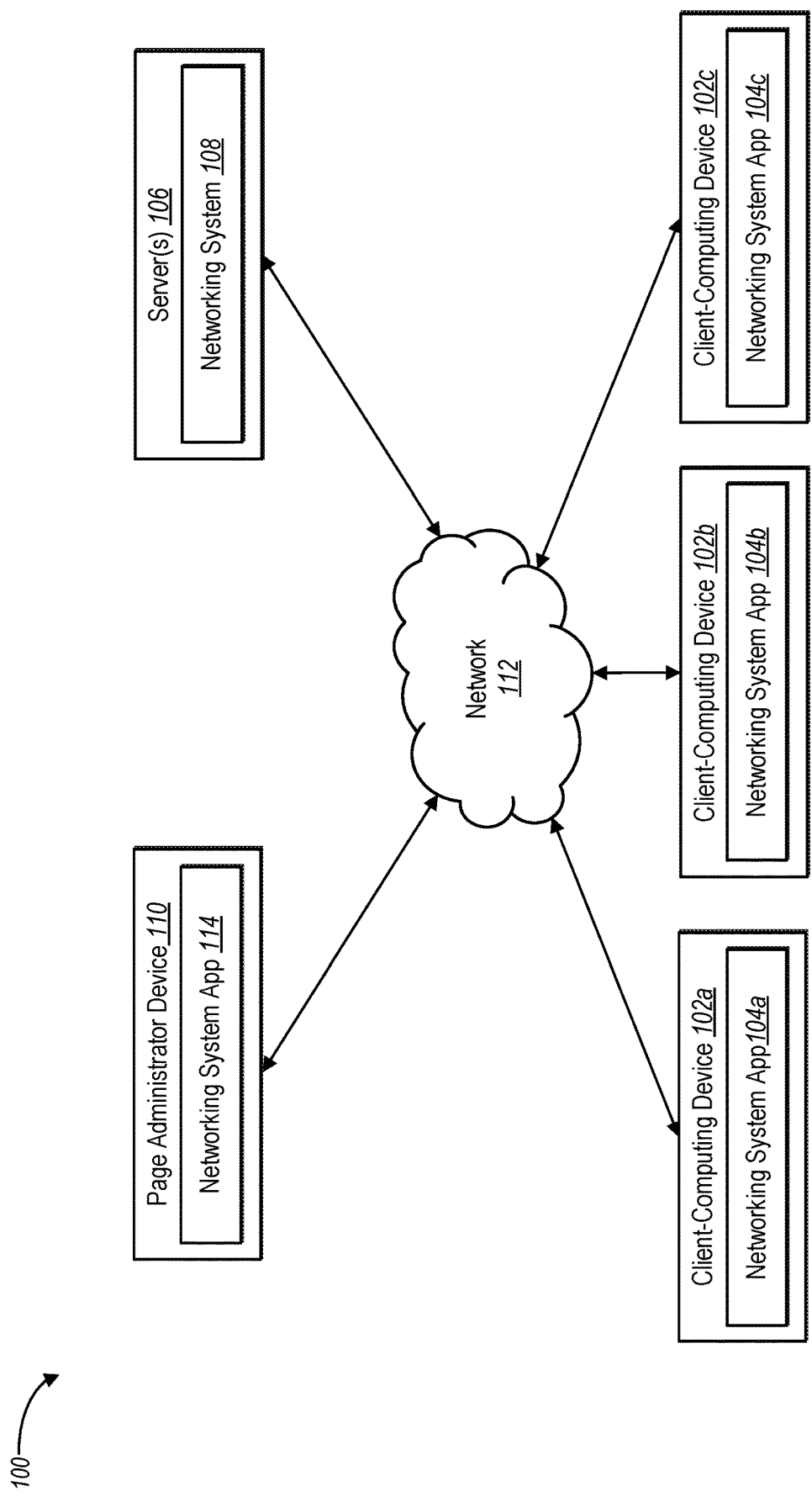
FIG. 1 illustrates a schematic diagram of an offer management system in accordance with one or more embodiments.

One or more embodiments described herein provide benefits and/or solve one or more of the foregoing or other problems in the art with systems and methods for distributing offers within a networking system. In accordance with features described in more detail below, a networking system detects a composition of an unstructured social networking communication (e.g., a post, message, etc.) and then analyzes the unstructured social networking communication to generate a confidence score representing a confidence that the unstructured social networking communication includes an offer. Based on the generated confidence score, the networking system can determine whether the unstructured social networking communication includes an offer (e.g., an offer to obtain a discount on a merchant's product). In response to determining that the unstructured social networking communication likely includes an offer, the networking system can then prompt (e.g., prompt the author of the post) to convert the unstructured social networking communication into a structured offer. Once the networking system converts the unstructured communication into a structured offer, the networking system can provide a rich set of tools to promote, track, and/or otherwise manage the structured offer. By converting an unstructured communication into a structured offer, a merchant for example enables additional functionality within the networking system for more effectively distribute an offer to networking system users.

In some embodiments, after a merchant (e.g., a page administrator for the merchant) composes an unstructured networking system post, the networking system performs a threshold analysis of the unstructured post to determine whether the post includes an offer. For example, the networking system can input data for the unstructured post into a trained model to generate a confidence score that indicates a confidence or likelihood that the unstructured post includes an offer. The networking system can then compare the generated score to a predetermined threshold value to determine whether the generated score satisfies (e.g., meets or exceeds) the threshold value. If the generated score satisfies the threshold value, the networking system can determine that the unstructured post likely includes an offer and prompt the author of the post to convert the post into a structured offer. As will be explained in more detail below, the analysis of the unstructured post can include analyzing the unstructured post to determine if it contains content (e.g., keywords, phrases, images, digital videos, etc.) typically found in posts that include offers. These "offer indicators" may be in the main body of the unstructured post, within metadata associated with the unstructured post, or within comments associated with the unstructured post. Additional offer indicators may be associated with a merchant, a profile page, or a page administrator associated with the unstructured post.

When performing the threshold analysis, the networking system can select from a plurality of threshold values to use for the analysis based on information associated with a source (e.g., merchant or corresponding profile page) and/or author (e.g., page administrator) of the unstructured post. For example, if information associated with an author of an unstructured post indicates that the author is not familiar with structured offers and/or has not been prompted to create a structured offer in the past, the networking system can select a relatively lower threshold value for the threshold analysis. In contrast, if information associated with an author of an unstructured post indicates that the author is familiar with structured offers and/or has declined a prompt to create a structured offer in the past, the networking system can select a relatively higher threshold value for the threshold analysis (e.g., to limit the likelihood of prompting the author to convert an unstructured post to a structured offer if the author is not likely to be interested). As an alternative, when generating a confidence score, the networking system can weight the confidence score to account for the information associated with the author or source of the unstructured post.

As mentioned above and as will be described in more detail below, based on a generated confidence score for an unstructured post, the networking system can provide a prompt to convert the unstructured post to a structured offer. In further embodiments, the networking system can customize one or more aspects of the prompt in accordance with a history associated with an author or source of the unstructured post. For example, if an author of a structured post has previously declined a prompt to convert an unstructured post to a structured offer, the networking system can adjust one or more aspects of a prompt to decrease an intrusiveness or aggressiveness of the prompt. To illustrate, the networking system can customize contents of the prompt, customize an appearance of the prompt, customize a location of the prompt, and/or customize a timing of the prompt, as will be described in more detail below.

Once the networking system creates a structured offer from a networking system post, the networking system can make a range of tools available to the merchant associated with the new structured offer. For example, the networking system can target a specific audience defined by the merchant to receive the structured offer. Additionally, the networking system can track how networking system users interact with the structured offer (e.g., by clicking on the structured offer, by saving the offer associated with the structured offer for later user). Furthermore, the networking system can track whether and when networking system users redeem an offer associated with the structured offer, and so forth.

As used herein, the term "networking system" refers to a system that supports and enables online communication, input, interaction, content-sharing, and collaboration between users. For example, a networking system can be a social networking system, a messaging system, etc. A user of the networking system can have one or more "friends" via the networking system. As used herein, the term "friend" refers to a co-user associated with a user via the networking system (i.e., a contact or connection). A networking system user may be an individual, a group of individuals, or a business (e.g., a merchant). A business entity (e.g., a merchant) can have a "page" or "profile page" within the networking system, through which one or more page administrators can publish posts and otherwise share content with users that have "liked" or who "follow" the page.

As used herein, the terms "unstructured networking system post" and "unstructured post" refer to a standard social networking post including text and/or other content (e.g., videos or images) that is not structured or organized beyond a standard designation of the portions of the post (e.g., a designation of the portion of the post that is text). For example, the text of an unstructured post is not classified or organized into different categories and/or designated as including certain types of information. Furthermore, a networking system typically distributes unstructured posts in accordance with a standard distribution algorithm to users that are friends with, followers of, or like a page for the source (e.g., page admin, merchant, user) of the unstructured post. For example, upon receiving a standard unstructured post from a networking system user, the networking system adds the unstructured post to the newsfeeds for the user's friends within the networking system in a way that is not distinguished from other unstructured posts.

As used herein, the term "structured offer" refers to a networking system post including structured data for an offer. For example, a "structured offer" can organize information included in the post into a plurality of categories and/or fields related to an offer. To illustrate, the structured offer can include structured data related to offer availability (e.g., whether the offer is available online and/or in the store), a URL related to the officer (e.g., a URL for a merchant's web site and/or for a web page associated with an offered product), an offer type (e.g., percent off, amount off, buy one-get one, or free), a value of the offer (e.g., a percentage value, dollar value, or a quantity), a title of the offer, a description, and/or media content (e.g., photos or videos). In other words, a structured post includes data that is organized in accordance with preset parameters for the data while an unstructured post has no preset parameters or organization. The networking system can leverage the structured nature of the structured offer to know how to present, distribute, track, and/or manage the structured offer. For example, the networking system can distribute structured offers in a way that differs from the distribution of standard unstructured posts.

FIG. 1 illustrates a schematic diagram of an example offer management system 100 in accordance with one or more embodiments of the present disclosure. As illustrated in FIG. 1, the offer management system 100 includes a networking system 108 (implemented on server(s) 106), a page administrator device 110, and a plurality of client-computing devices 102a-102c (collectively referred to herein as "client-computing devices 102"), which are communicatively coupled through a network 112. As shown in FIG. 1, the client-computing devices 102 include the networking system applications 104a-104c, respectively. Similarly, the page administrator device 110 includes a networking system app 114.

The client-computing devices 102, page administrator device 110, and networking system 108 communicate via the network 112 using one or more communication platforms or technologies suitable for transmitting data and/or communication signals. In one or more embodiments, the network 112 includes the Internet or World Wide Web. The network 112, however, can include various other types of networks that use various communication technologies and protocols, such as a corporate intranet, a virtual private network ("VPN"), a local area network ("LAN"), a wireless local network ("WLAN"), a cellular network, a wide area network ("WAN"), a metropolitan area network ("MAN"), or a combination of two or more such networks. Although FIG. 1 illustrates a particular arrangement of the client-computing devices 102, in additional embodiments, the client-computing devices 102 may directly communicate with the networking system 108, bypassing the network 112. Additional details relating to the network 112 are explained below with reference to FIG. 6.

In one or more embodiments, each of the client-computing devices 102 and page administrator device 110 can be one or more of various types of computing devices. For example, the client-computing devices 102 and page administrator device 110 can include one or more mobile devices, such as a mobile telephone, a smartphone, a PDA, a tablet, or a laptop. Additionally or alternatively, the client-computing devices 102 and page administrator device 110 can include one or more non-mobile devices such as a desktop, a server, or another type of computing device. Additional details with respect to example computing devices are discussed below with respect to FIG. 5.

As will be described in more detail below, the components of the offer management system 100 can provide, alone and/or in combination with the other components, one or more graphical user interfaces ("GUIs"). In particular, the networking system applications 104a, 104b, 104c, 114 can display one or more GUIs generated by the networking system 108. The networking system applications 104a, 104b, 104c, 114 can allow a user to consume, create, and/or share content via the networking system 108. FIGS. 2A-2D and the description that follows illustrate various example embodiments of GUIs and features that are in accordance with general principles as described above.

In some embodiments, the page administrator device 110 is associated with a merchant. For example, the page administrator device 110 can be associated with a page administrator (or "page admin") for a profile page of the merchant on the networking system 108. Using the page administrator device 110, the page administrator for the merchant can compose and publish unstructured social networking posts to be distributed, for example, to users of the networking system 108 (e.g., users of client-computing devices 102) that follow or "like" the merchant's social networking page. The networking system application 114 installed on the page administrator device 110 can provide a variety of GUIs to facilitate management of the merchant's social networking page and/or content shared by way of the merchant's social networking page. In some embodiments, the page administrator can utilize the page administrator device 110 to compose an unstructured social networking post including an offer to share via the networking system 108 and then, when prompted by the networking system 108, can select an option to convert the unstructured post into a structured offer as explained in more detail below.

Figure 2A:
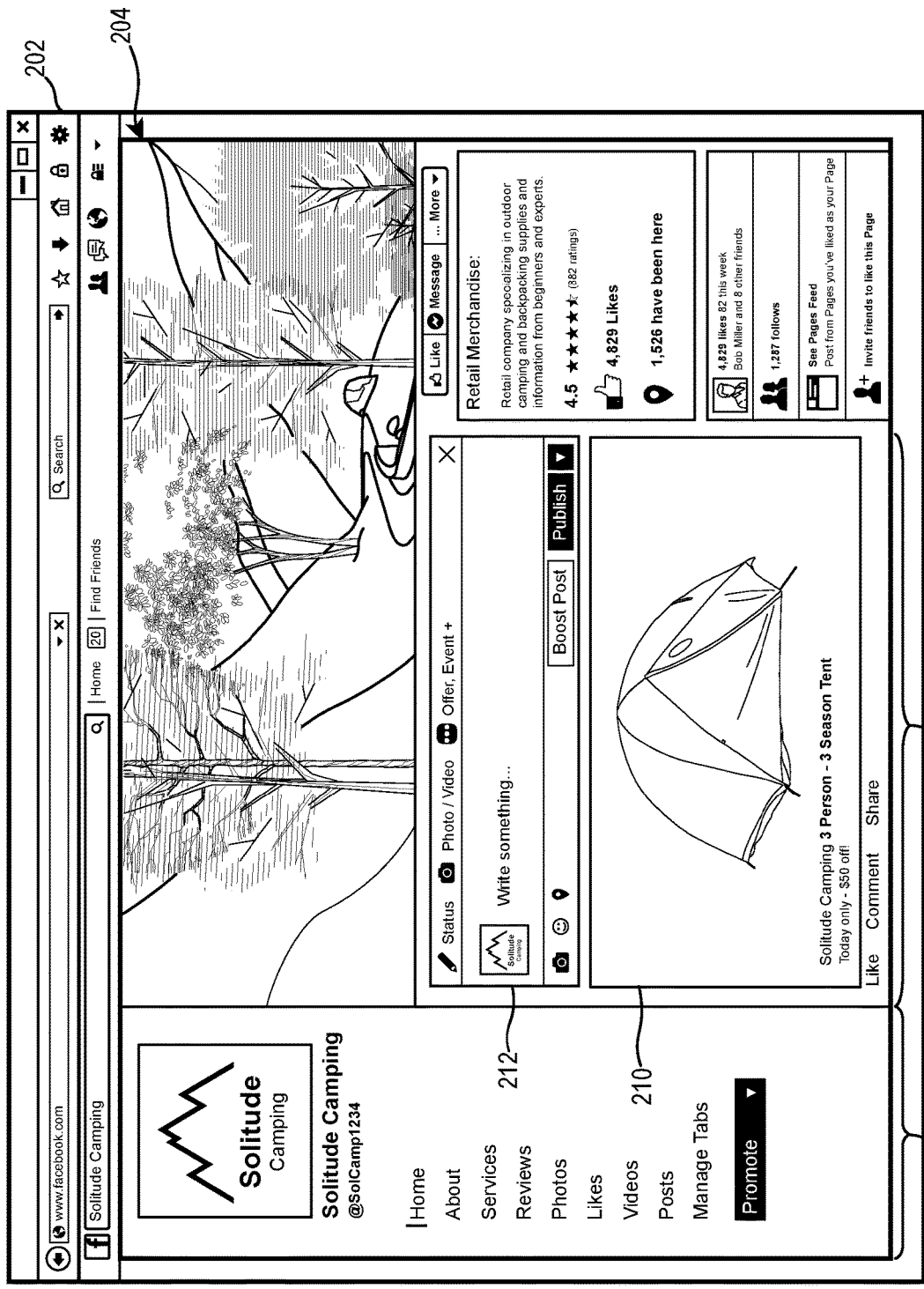

FIG. 2A illustrates an example interface for managing a social networking page. In particular, FIG. 2A illustrates an example of page admin home page 204 for managing a social networking page for a merchant (e.g., "Solitude Camping"). As one example, a page administrator could use the page administrator device 110 shown in FIG. 1 to access the page admin home page 204 and perform one or more actions associated with the social networking page. For example, using the page admin home page 204, a page administrator could compose and publish a social networking post including an offer (e.g., a promotional offer to made available to a limited number of users) to be made available to followers of the page, as will be described in more detail below.

As illustrated in FIG. 2A, networking system application 114 installed on the page administrator device 110 provides the page admin home page 204 via the display 202. In one or more embodiments, the display 202 of the page administrator device 110 may be a touch screen display of a mobile phone or tablet, or may be a monitor of a laptop or desktop computer, etc. As shown in FIG. 2A, the page admin home page 204 includes a navigation list 206 and a networking system wall 208. In one or more embodiments, the networking system wall 208 includes one or more posts 210 previously composed and submitted by the page administrator on the merchant's behalf. Additionally, the networking system wall 208 includes a post composition box 212, wherein the page administrator can compose a post to submit to the networking system 108.

Figure 2B:
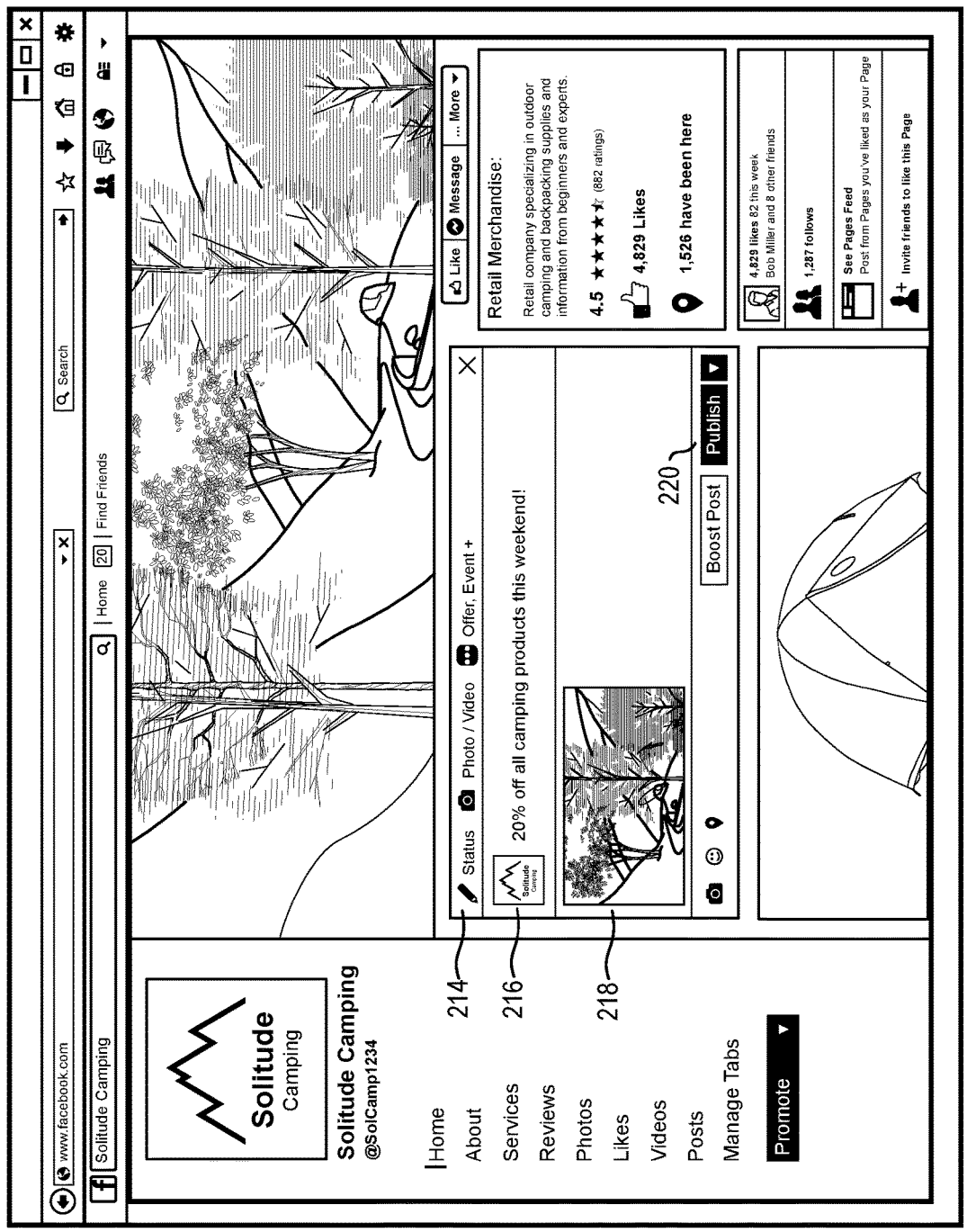

For example, in one or more embodiments and in response to the page admin selecting the post composition box 212 in FIG. 2A, the networking system application 114 provides the post composition dialogue 214, as shown in FIG. 2B. In at least one embodiment, the post composition dialogue 214 provides a text input box 216 and a multi-media input box 218. Utilizing the text input box 216 and the multi-media input box 218, the page admin can compose an unstructured post including text, digital photographs, digital videos, and so forth. As shown in FIG. 2B, the page admin is composing a networking system post via the post composition dialogue 214 that includes text (i.e., "20% off all camping products this weekend!") and a digital image. The page admin can submit the composed unstructured post to the networking system 108 by clicking the publish button 220.

As discussed above, the offer management system 100 detects a composition of an unstructured post and then analyzes the unstructured post to determine whether the unstructured post includes an offer. Accordingly, upon submission of the unstructured post shown in FIG. 2B, the networking system 108 analyzes the unstructured post to determine whether the post includes an offer. As described above, in one or more embodiments, the networking system 108 begins the analysis with a threshold analysis to determine whether the unstructured post includes an offer. For example, the networking system 108 can utilize natural language processing, keyword searches, machine learning, and so forth to determine the contents of the unstructured post includes one or more offer indicators, such as, but not limited to, "20% off," "this weekend," etc.

To further illustrate, the networking system 108 can also utilize image analysis in connection with multi-media included in an unstructured post to determine whether the post includes one or more offer indicators. For example, the networking system 108 can identify text within a digital image (e.g., as with a sale offer depicted in a digital photograph). Additionally, the networking system 108 can utilize audio analysis to identify keywords and phrases in a digital video.

In at least one embodiment, the networking system 108 makes the threshold determination as to whether an unstructured post includes an offer by inputting data for the post into a trained model to generate a confidence score for the unstructured post. In at least one embodiment, the generated confidence score represents a level of confidence that the unstructured post does indeed include an offer. For example, the networking system 108 may provide information extracted from or related to the unstructured post (e.g., the text of the post, the formatting of the post, keywords identified from the post, etc.) as inputs to the trained machine learning model. In at least one embodiment, the output of the trained machine learning model is a confidence score indicating a level of confidence that the unstructured post contains an offer. For example, the confidence score provided by the trained machine learning model may be represented as a percentage (e.g., "80% confident that the post includes an offer").

Figure 2C:
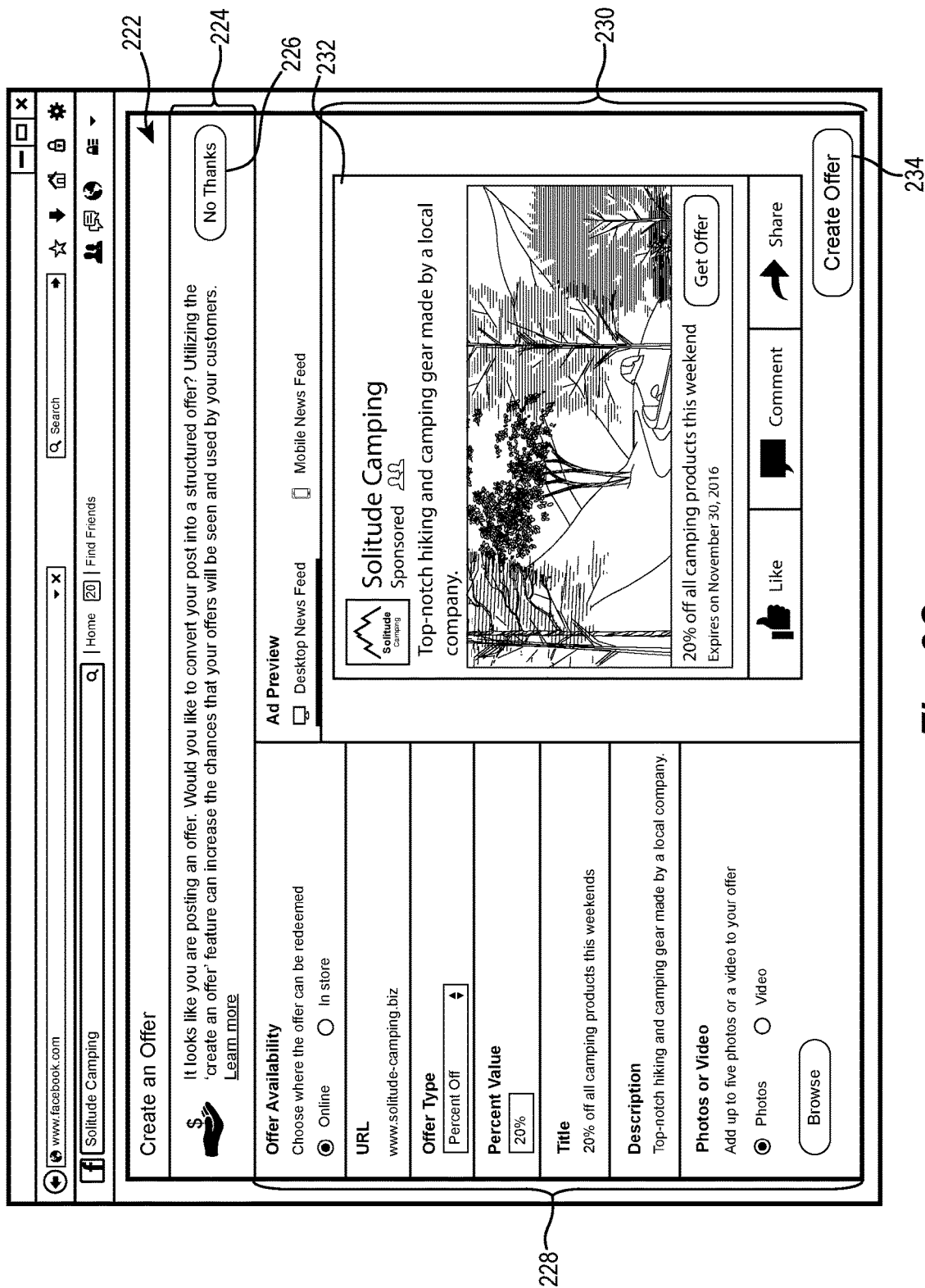

In response to determining that the confidence score meets or exceeds a predetermined threshold value, the networking system 108 prompts the page admin to convert the unstructured post to a structured offer. For example, as shown in FIG. 2C, the networking system application 114 prompts the page admin to convert the submitted unstructured post to a structured offer via the create an offer GUI 222. In one or more embodiments, the create an offer GUI 222 is a full-screen GUI that the networking system application 114 provides to the page admin via the display 202 associated with the page administrator device 110. As will be discussed further below with reference to FIG. 3, the networking system 108 can customize the contents of the prompt based on previous interactions between the page admin and the offer management system 100. For example, the networking system 108 may provide the create an offer GUI 222 in response to determining that the page admin has utilized the offer management system 100 to convert previous unstructured posts to structured offers. If the page admin had never utilized the offer management system 100 previous, the networking system 108 may provide a prompt with a decreased level of intrusiveness (e.g., with an icon in a toolbar in the page admin home page 204).

As shown in FIG. 2C, in at least one embodiment, the create an offer GUI 222 includes an offer explanation 224, various offer configuration options 228, and an offer preview 230. For example, the offer explanation 224 includes text explaining to the page admin the purpose of an offer and the benefits of converting the post into a structured offer. If the page admin does not wish to convert the post into a structured offer, the page admin can simply click the no thanks button 226.

If the networking system 108 has correctly identified an offer in the page admin's unstructured post, and the page admin wishes to proceed with converting the post to a structured offer, the page admin can provide information related to the offer via the offer configuration options 228. In one or more embodiments, the offer configuration options 228 provide various text boxes, radio buttons, drop-down lists, and so forth where the page admin may enter information to create the structured offer. Utilizing the offer configuration options 228, the page admin can specify information including, but not limited to, the title of offer, the description of the offer, the expiration of the offer, multi-media for the offer (e.g., an image or video), a target audience for the offer, a geographic limitation for the offer, etc.

In at least one embodiment, the networking system 108 can auto-populate the offer configuration options 228 with information extracted from the submitted unstructured post. For example, utilizing natural language processing, text analysis, machine learning, keyword analysis, Internet searches, and so forth, the networking system 108 can extract offer indicators such as the offer type (e.g., "Percent Off"), the percent value (e.g., "20%"), etc. from the contents of the unstructured post submitted by the page admin. The networking system 108 can then utilize these extracted offer indicators to auto-populate the offer configuration options 228. In one or more embodiments, the page admin may alter or add to any of the information listed in the configuration options 228.

The networking system 108 creates a preview of the structured offer using the information populating the configuration options 228. For example, as shown in FIG. 2C, the offer preview 230 shows a preview of a structured offer 232 including all the information populating the configuration options 228. As shown, the structured offer 232 includes the offer text extracted from the unstructured post (e.g., "20% Off All Camping Products This Weekend"), the digital image extracted from the unstructured post, as well as an identifier associated with the merchant (e.g., "Solitude Camping") who the page admin is representing. In at least one embodiment, the networking system 108 can even add text taken from a website associated with the merchant (e.g., "Top-notch hiking and camping gear made by a local company"). The networking system 108 can create the structured offer in response to the page admin clicking the create offer button 234.

In addition to customizing the offer prompt in response to previous interactions between the page admin and the offer management system 100, the networking system 108 can also customize the offer prompt in response to the generated confidence score. For example, in response to a confidence score that is very close to a threshold value, the networking system 108 can prompt the page admin with a relatively unobtrusive method (e.g., a pop-up window containing simple text explaining the purpose of an offer). In another example, in response to a confidence score that is well above the threshold value, the networking system 108 can prompt the user in a more aggressive way (e.g., a full GUI such as the offer GUI 222 illustrated in FIG. 2C).

In response to the page admin selecting the create offer button 234, as shown in FIG. 2C, the networking system 108 can generate and add the structured offer 232 to the newsfeeds of one or more networking system users. For example, as shown in FIG. 2D, a networking system application provides the newsfeed GUI 238 on the touch screen display 236 of the client-computing device 235. In this embodiment, the user of the client-computing device 235 is a networking system user who has been identified by the networking system 108 as an appropriate recipient of the merchant's offer. Accordingly, the networking system application on the client-computing device 235 adds the structured offer 232 to the user's newsfeed 240 along with other posts 242 contained therein.

In at least one embodiment, the structured offer 232 includes additional controls unique to structured offers that the networking system 108 does not make available for normal posts. For example, as shown in FIG. 2D, the structured offer 232 includes a get offer button 244. In one or more embodiments, in response to detecting a selection of the get offer button 244, the networking system 108 saves the offer represented by the structured offer 232 to a list of offers associated with the user's networking system account. The user may then browse and utilize these saved offers in various ways (e.g., for online purchases, for in-person purchases, etc.).

Figure 3:
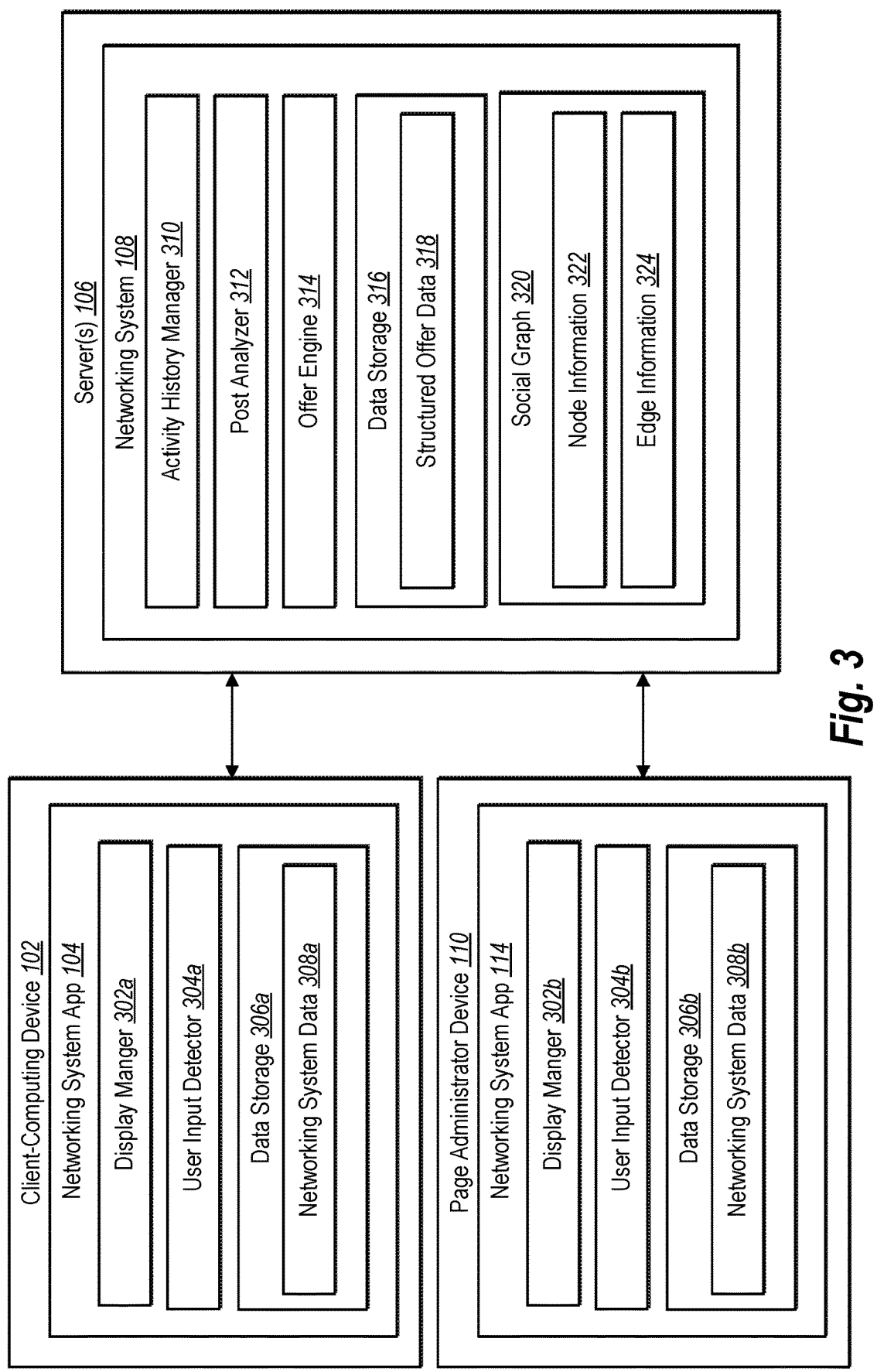
FIG. 3 illustrates a detailed schematic diagram of the networking system in accordance with one or more embodiments.

FIG. 3 illustrates a schematic diagram illustrating an example embodiment of the offer management system 100. As shown in FIG. 3, the offer management system 100 includes various components for performing the processes and features described herein. For example, as shown in FIG. 3, the offer management system 100 includes but is not limited to, the client-computing device 102 (e.g., one of client-computing devices 102), the page administrator device 110, and the server 106 hosting the networking system 108. In one or more embodiments, the client-computing device 102 includes a networking system application 104 (e.g., one of the networking system applications 104a-104c). Similarly, the page administrator device 110 includes the networking system application 114. The networking system application 104 and the networking system application 114 include a display manager 302a, 302b, a user input detector 304a, 304b, and a data storage 306a, 306b including networking system data 308a, 308b. Additionally, in one or more embodiments, the networking system 108 includes an activity history manager 310, a post analyzer 312, and offer engine 314, and a data storage 316 including structured offer data 318.

In at least one embodiment, the networking system 108 identifies and analyzes networking system user data (e.g., including activity history data). Accordingly, in one or more embodiments, the networking system 108 includes a social graph 320 for representing a plurality of users, actions, and concepts. In one or more embodiments, the social graph 320 includes node information 322 and edge information 324. Node information 322 of the social graph 320 stores information including, for example, nodes for users and nodes for repositories. Edge information 324 of the social graph 320 stores information including relationships between nodes and/or actions occurring within the networking system 108. Further details regarding the networking system 108, the social graph 320, edges, and nodes is presented below with respect to FIG. 7.

Each of the components of the networking system application 104 and the networking system application 114, and the components of the networking system 108 can be implemented using a computing device including at least one processor executing instructions that cause the offer management system 100 to perform the processes described herein. In some embodiments, the networking system components described herein can be implemented by the networking system 108, or across multiple server devices. Additionally or alternatively a combination of one or more server devices and one or more client devices can implement the components described herein. Additionally or alternatively, the components described herein can comprise a combination of computer-executable instructions and hardware.

In one or more embodiments, the networking system application 104 and the networking system application 114 are native applications installed on the client-computing device 102, and the page administrator device 110, respectively. For example, the networking system application 104 and the networking system application 114 can be mobile applications that install and run on a mobile device, such as a smart phone or a tablet computer. Alternatively, the networking system application 104 and the networking system application 114 can be desktop applications, widgets, or another form of a native computer program. Furthermore, the networking system application 104 and the networking system application 114 may be remote applications accessed by the client-computing device 102 or the page administrator device 110, respectively. For example, the networking system application 104 and the networking system application 114 may be web applications that are executed within a web browser of the client-computing device 102 or the page administrator device 110, respectively.

As mentioned above, and as shown in FIG. 3, the networking system application 104 and the networking system application 114 include a display manager 302a, 302b. The display manager 302a, 302b provides, manages, and/or controls a graphical user interface that allows a networking system user (e.g., a page administrator, a recipient of a structured offer, etc.) to interact with features of the networking system 108. For example, the display manager 302a provides a graphical user interface that facilitates the display of the networking system newsfeed associated with the user of the client-computing device 102. As discussed above, the user's newsfeed can include social networking posts composed by co-users (e.g., "friends") of the user of the client-computing device 102, along with articles, advertisements and so forth. In another example, the display manager 302b provides an offer prompt to the page admin on the page administrator device 110.

More specifically, the display manager 302a, 302b facilitates the display of a graphical user interface. For example, the display manager 302a, 302b may compose the graphical user interface of a plurality of graphical components, objects, and/or elements that allow a user to engage in networking system activities. More particularly, the display manager 302a, 302b may direct the client-computing device 102 and the page administrator device 110, respectively, to display a group of graphical components, objects, and/or elements that enable a user to interact with various features of the networking system 108.

In addition, the display manager 302a, 302b directs the client-computing device 102 and the page administrator device 110, respectively, to display one or more graphical objects, controls, or elements that facilitate user input for interacting with various features of the networking system 108. To illustrate, the display manager 302a, 302b provides a graphical user interface that allows a networking system user to input one or more types of content into a networking system post or electronic message. As used herein, "content" refers to any data or information to be included as part of a networking system post or electronic message. For example, the term "content" will be used herein to generally describe text, images, digital media, files, location information, payment information, or any other data that can be included as part of a networking system post or electronic message.

The display manager 302a, 302b also facilitates the input of text or other data for the purpose of interacting with one or more features of the networking system 108. For example, the display manager 302a, 302b provides a user interface that includes a touch display keyboard. A networking system user can interact with the touch display keyboard using one or more touch gestures to input text to be included in a networking system post or electronic message. For example, a networking system user can use the touch display keyboard to compose a message. In addition to text, the graphical user interface including the touch display keyboard can facilitate the input of various other characters, symbols, icons, or other information.

Furthermore, the display manager 302a, 302b is capable of transitioning between two or more graphical user interfaces. For example, in one embodiment, the display manager 302a provides a newsfeed to the user of the client-computing device 102 containing one or more networking system posts from co-users along with various offers provided by the networking system 108. Later, in response to detected input from the user of the client-computing device 102 in connection with a particular displayed offer, the display manager 302a transitions to a second graphical user interfaces that includes additional details related to a displayed offer.

As further illustrated in FIG. 3, the networking system application 104 and the networking system application 114 include a user input detector 304a, 304b. In one or more embodiments, the user input detector 304a, 304b detects, receives, and/or facilitates user input in any suitable manner. In some examples, the user input detector 304a, 304b detects one or more user interactions with respect to the user interface. As referred to herein, a "user interaction" means a single interaction, or combination of interactions, received from a user by way of one or more input devices.

For example, the user input detector 304a, 304b detects a user interaction from a keyboard, mouse, touch page, touch screen, and/or any other input device. In the event the client-computing device 102 or the page administrator device 110 includes a touch screen, the user input detector 304a, 304b detects one or more touch gestures (e.g., swipe gestures, tap gestures, pinch gestures, reverse pinch gestures) from a user that forms a user interaction. In some examples, a user can provide the touch gestures in relation to and/or directed at one or more graphical objects or graphical elements of a user interface.

The user input detector 304a, 304b may additionally, or alternatively, receive data representative of a user interaction. For example, the user input detector 304a, 304b may receive one or more user configurable parameters from a user, one or more commands from the user, and/or any other suitable user input. The user input detector 304a, 304b may receive input data from one or more components of the networking system 108, or from one or more remote locations.

The networking system application 104 and the networking system 114 perform one or more functions in response to the user input detector 304a, 304b detecting user input and/or receiving other data. Generally, a user can control, navigate within, and otherwise use the networking system application 104, 114 by providing one or more user inputs that the user input detector 304a, 304b can detect. For example, in response to the user input detector 304a detecting user input, one or more components of the networking system application 104 allow the user of the client-computing device 102 to scroll through a newsfeed. In another example, in response to the user input detector 304b detecting user input, one or more components of the networking system application 114 allow the page admin to configure a structured offer.

As shown in FIG. 3, and as mentioned above, the networking system application 104, 114 also includes the data storage 306a, 306b. The data storage 306a, 306b includes networking system data 308a, 308b. In one or more embodiments, the networking system data 308a, 308b is representative of networking system data information, such as described herein.

Also as shown in FIG. 3, and as mentioned above, the server 106 hosts the networking system 108. The networking system 108 provides networking system posts, electronic messages, structured objects, and so forth to one or more users of the networking system 108 (e.g., by way of a profile, a newsfeed, a communication thread, a timeline, a "wall", or any other type of graphical user interface). For example, one or more embodiments provide a user with a networking system newsfeed containing posts from one or more co-users associated with the user (e.g., "friends"), as well as structured objects (e.g., structured offers) and other advertisements.

In one or more embodiments, a networking system user scrolls through the networking system newsfeed in order to view recent networking system posts submitted by the one or more co-users associated with the user via the networking system 108. In one embodiment, the networking system 108 organizes the networking system posts chronologically in a user's networking system newsfeed or wall. In alternative embodiments, the networking system 108 organizes the networking system posts geographically, by interest groups, according to a relationship coefficient between the user and the co-user, etc. Additionally, in one or more embodiments, the user can download a copy of the networking system newsfeed as a record of the networking system posts displayed thereon.

The networking system 108 also enables the user to engage in all other types of networking system activity. For example, the networking system 108 enables a networking system user to scroll through newsfeeds, click on posts and hyperlinks, view and save offers, compose and submit electronic messages and posts, interact with structured objects, and so forth.

As mentioned above, "structured data" can include any data that is structured into specific groups, fields, or categories, and/or is associated with particular aspects of an offer. For example, structured data can include metadata associated with node and edge information related to an offer, information related to the offer's author, information related to a particular item featured in the offer, and interaction information related to the offer within the networking system 108. To illustrate, structured data for an offer can include formatting information, the offer author's name and location, content of the offer, expiration information related to the offer, or any other specific types of information/data associated with the offer. The structured data may also include various multimedia content such as images (e.g., digital pictures, digital map images), video audio, etc. Using this structured data, the networking system 108 can facilitate the insertion of structured objects within a newsfeed, a listing, or elsewhere.

As shown in FIG. 3, and as mentioned above, the networking system 108 handles all activities related to structured offers. For example, the networking system 108 identifies offers within networking system posts and converts the offer information from within the networking system posts into structured offers.

As shown in FIG. 3, the networking system 108 includes the activity history manager 310. As mentioned above, the networking system 108 bases a portion of the confidence score calculation for an unstructured post on previous networking system activity associated with the networking system user who composed the unstructured post. For example, if the post composer has previously indicated that the networking system 108 has correctly identified an offer within an unstructured post, the networking system 108 may give added weight to a future confidence score indicating that another post also includes an offer. Accordingly, based on a networking system user's privacy settings, the activity history manager 310 collects activity information from the networking system 108. In one or more embodiments, the collected activity information includes a networking system user's previous responses to prompts to convert an unstructured post to a structured offer, the user's previous posts, the user's profile information and profile updates, the user's previous comments, the user's previous "likes," the user's "friends," the user's previous clicks, hovers, scrolls, and so forth.

In one or more embodiments, depending on privacy settings, the activity history manager 310 also collects networking system activity history information related to how networking system users interact with one or more structured offers. For example, as mentioned above, in return for converting an unstructured post into a structured offer, the post composer may utilize a range of tools the networking system 108 makes available in association with structured offers. To illustrate, the activity history manager 310 can collect information including how many networking system users have received a structured offer, a number of times the structured offer has been redeemed, a conversion rate associated with the structured offer, how many networking system users in a geographic area clicked on the structured offer, how average amount of time between when a networking system user saves a structured offer and when the user utilizes the offer, and so forth. In one or more embodiments, the networking system 108 provides these insights to a page administrator who makes an offer available via the networking system 108.

Also as shown in FIG. 3 and as mentioned above, the networking system 108 includes the post analyzer 312. In one or more embodiments, the post analyzer 312 analyzes the contents of an unstructured post in order to identify one or more offer indicators in the unstructured post. In at least one embodiment, the post analyzer 312 utilizes natural language processing, machine learning, keyword lookups, etc. to identify offer indicators including words and phrases within a networking system post that are indicative of a potential offer. For example, the post analyzer 312 can identify words and phrases such as "10% off," "$5 off holiday decor," "buy one get one half off," and so forth. Additionally, the post analyzer 312 can identify other offer indicators such as digital media (e.g., digital photographs and videos), text formatting, metadata, and so forth associated with an unstructured post.

As additionally illustrated in FIG. 3, the networking system 108 includes the offer engine 314. In one or more embodiments, the offer engine 314 determines a threshold value associated with an unstructured post, calculates a confidence score for the unstructured post, and determines whether the calculated confidence score satisfies the threshold value. For example, as mentioned above, the offer engine 314 determines the threshold value based on information associated with a source (e.g., a merchant or corresponding profile page) and/or author (e.g., page administrator) of the unstructured post. To illustrate, if networking system activity associated with the page admin indicates that the page admin has never interacted with the offer management system 100, the offer engine 314 can select a low threshold value. In contrast, if the networking system activity associated with the page admin indicates that the page admin has opted to convert many unstructured posts to structured offers, the offer engine 314 can select a high threshold value (e.g., indicating the page admin is relatively sophisticated in the use of the offer management system 100). In other words, a higher threshold value limits the likelihood that the offer management system 100 will prompt the page admin to convert an unstructured post that the page admin is not interested in converting.

Additionally, the offer engine 314 calculates a confidence score for an unstructured post. For example, as mentioned above, the confidence score calculated for an unstructured post represents a level of confidence that the offer management system 100 has correctly identified a merchant offer within the unstructured post. In at least one embodiment, the post analyzer 312 calculates a confidence score for a particular post by utilizing a trained machine learning model.

Thus, in one or more embodiments, the offer engine 314 maintains and trains a machine learning model. A machine learning model is a type of machine learning that is generally trained to give a single output in response to a large number of inputs that may or may not be unknown. For example, given a large number of inputs related to the contents of a networking system post, the offer engine 314 trains a neural network to determine whether or not the networking system post actually includes a merchant offer. In at least one embodiment, the offer engine 314 initially trains the neural network by providing training data including a set of known inputs and outputs.

For example, the offer engine 314 can train the machine learning model by running a known set of inputs through the neural network and comparing the output of the neural network to the known output for the set of inputs. The offer engine 314 can then back-propagate the neural network until the output for that set of inputs is correct. The offer engine 314 repeats this process hundreds or thousands of times until the neural network consistently gives correct outputs. At that point, the machine learning model is "trained," and the offer engine 314 can run new inputs through the neural network in order to receive an output that is likely correct.

In at least one embodiment, the output of the trained machine learning model is a confidence score indicating a level of confidence that a networking system post contains a merchant offer. In at least one embodiment, the confidence score is a numeral. For example, in at least one embodiment, the trained neural network outputs a numeral within a range and the higher the numeral, the more confident the neural network is that the social networking post represented in the inputs to the neural network contains a merchant offer. In alternative embodiments, the trained neural network outputs a percentage (e.g., "80% certain the post contains an offer").

The offer engine 314 can add further weight to the calculated confidence score related to an unstructured post based on previous networking system activity associated with the composer of the post. For example, if the networking system 108 previously prompted the post's composer to convert a previous post to a structured offer and the post's composer accepted the prompt, the offer engine 314 may add extra weight to the calculated confidence score. Conversely, if the networking system 108 previously prompted the post's composer and the post's composer refused the prompt, the offer engine 314 may subtract an amount from the calculated confidence score. Furthermore, if the post's composer has successfully created previous structured offers, the offer engine may add extra weight to the calculated confidence score.

Furthermore, the offer engine 314 determines whether the calculated and weighted confidence score for an unstructured post satisfies the determined threshold value. In one or more embodiments, in response to determining the weighted confidence score for a networking system post is above the threshold value, the offer engine 314 can generate a prompt asking the composer of the post to convert the unstructured post to a structured offer. For example, the threshold amount can be predetermined by the offer engine 314, as described above, or may be specified by a networking system user (e.g., the merchant). Additionally or alternatively, the offer engine 314 may adjust the threshold amount over time depending on responses from post composers. For example if a post composer repeatedly refuses prompts to convert posts into structured offer, the offer engine 314 may increase the threshold amount for that post composer.

In one or more embodiments, the offer engine 314 generates prompts at different levels of engagement depending on various factors. For example, the offer engine 314 can generate prompts that have a very low level of engagement (e.g., prompts that are very unobtrusive), such as a simple notification icon in a toolbar. The offer engine 314 can also generate prompts that have a medium level of engagement, such as a pop-up window with one line of simple text. Furthermore, the offer engine 314 can generate prompts with a high level of engagement, such as a pre-populated dialog window for creating a structured offer. Furthermore, the offer engine 314 can customize the prompt based on the determined level of engagement for the prompt. For example, the offer engine 314 can customize the contents of the prompt (e.g., a prompt with a low level of engagement may not include much text), the appearance of the prompt (e.g., a prompt with a high level of engagement may include bright colors), the location of the prompt (e.g., a prompt with a medium level of engagement may be located in a banner along the side of a networking system display), the timing of the prompt (e.g., a prompt with a high level of engagement may be provided immediately upon submission of the unstructured post), and so forth.

In one or more embodiments, the offer engine 314 determines which level of engagement is appropriate for the generated prompt based on the networking system activity history associated with the page admin or merchant who composed the unstructured post. For example, the offer engine 314 can determine the level of engagement based on whether the offer engine has previously identified offers within previously composed posts by the composer with a high level of accuracy. If the composer has accepted the offer engine's 314 previous prompts to convert a networking system post into a structured offer, the offer engine 314 may determine a high level of engagement is appropriate for future prompts. Alternatively, if the composer has refused previous prompts, the offer engine 314 may determine a lower level of engagement is appropriate. In at least one embodiment, if the offer engine 314 is prompting a post composer for the first time, the offer engine 314 may default to a high level of engagement for the generated prompt. The offer engine 314 may then generate future prompts at lessening levels of engagement if the post composer consistently refuses the offer engine's 314 prompts to convert posts to structured offers. In at least one embodiment, the offer engine 314 may stop prompting the post composer for all future posts after the post composer refuses a given number of prompts from the offer engine 314.

In at least one embodiment and in response to a composer refusing a prompt to convert unstructured post, the offer engine 314 can collect information related to why the composer has refused the prompt. For example, the offer engine 314 can present a dialogue GUI with a number of various reasons why the composer has refused that the user may select (e.g., "This post does not contain an offer," "I do not want to make this offer into a structured object," etc.), and/or a text box where the user may write out a reason why the prompt was refused. In one or more embodiments, the offer engine 314 can analyze the user's response(s) to further inform the trained machine learning model as well as future confidence score calculations.

As mentioned above, in response to determining that a high level of engagement is appropriate for a generated prompt, the offer engine 314 can generate a prompt that includes a dialog window for creating a structured offer based on the networking system post. In at least one embodiment, the offer engine 314 can pre-populate the dialog window with identified offer indicators from the unstructured post such that the post composer simply has to click a button in order to create the structured offer (e.g., as shown with reference to FIG. 2C above).

Additionally, in some embodiments, the offer engine 314 can include added functionality to the offer features of the networking system 108 by integrating membership considerations into the structured offer. For example, in one or more embodiments, a merchant may enable networking system users to store membership information in association with their networking system profiles. In other words, if a networking system user has a membership with a merchant, the networking system 108 can store that user's membership information.

Thus, the merchant can configure a structured offer to incentivize networking system users to open memberships with the merchant in return for receiving the offer described by the structured offer. It follows that the networking system 108 can identify this type of offer in a networking system post composed by the merchant. To illustrate, the merchant may compose a networking system post with an offer that states, "25% off on all merchandise if you open a membership with us today!" In one or more embodiments, the post analyzer 312 can identify "membership" as a keyword. Furthermore, the offer engine 314 can provide and auto-populate additional configuration controls in the prompt to create a structured offer from the networking system post. In at least one embodiment, when a networking system user interacts with the resulting structured offer, the networking system 108 can assist that user in opening a membership with the merchant and saving the associated offer for later use.

Also, in response to the user confirming the information displayed within the create offer prompt, the offer engine 314 generates a structured offer and replaces the underlying networking system post in the networking system 108 with the structured offer. For example, in one or more embodiments, the networking system 108 publishes the underlying networking system post while the user is confirming or refusing the conversion of the post into a structured offer. After the post composer confirms the conversion of the post, the offer engine 314 can retract every instance of the underlying post within the networking system 108. In one or more embodiments, the offer engine 314 can then distribute the structured offer according to the audience defined by the configuration settings for the structured offer.

Furthermore, in at least one embodiment, the offer engine 314 collects and analyzes insights associated with a structured offer. For example, the offer engine 314 collects information including a number of users who select the structured offer, a number of users who redeem the structured offer, an amount of time that elapses between when a user selects the structured offer and when the user redeems the structured offer, and so forth. From this information, the offer engine 314 can generate a report for the merchant or page administrator that includes a number of users that received the structured offer, a number of times the structured offer has been redeemed, a conversion rate associated with the structured offer, and so forth. The offer management system 100 can provide this report to the merchant or page administrator based on a schedule (e.g., daily, weekly, bi-weekly, etc.) or on request.

Also as shown in FIG. 3, the networking system 108 includes the data storage 316. The data storage 316 includes structured offer data 318. In one or more embodiments, the structured offer data 318 is representative of offer information, such as described herein.

Furthermore, as shown in FIG. 3, the networking system 108 also includes the social graph 320. As mentioned above, the networking system 108 utilizes the social graph 320 to store and utilize structured offers. Accordingly, the networking system 108 includes a social graph 320 for representing a plurality of users, actions, and concepts. In one or more embodiments, the social graph includes node information 322 and edge information 324. Node information 322 of the social graph 320 stores node information including, for example, nodes for users and nodes for repositories. Edge information 324 of the social graph 320 stores edge information including relationships between nodes and/or actions occurring within the networking system 108. Further details regarding the networking system 108, the social graph 320, edges, and nodes is presented below with respect to FIG. 7.

FIGS. 1-3, the corresponding text, and the examples, provide a number of different methods, systems, and devices for identifying offers in networking system posts utilizing the offer management system 100. In addition to the foregoing, one or more embodiments can also be described in terms of flowcharts comprising acts and steps in a method for accomplishing a particular result. For example, FIG. 4 may be performed with less or more steps/acts or the steps/acts may be performed in differing orders. Additionally, the steps/acts described herein may be repeated or performed in parallel with one another or in parallel with different instances of the same or similar steps/acts.

Figure 4:
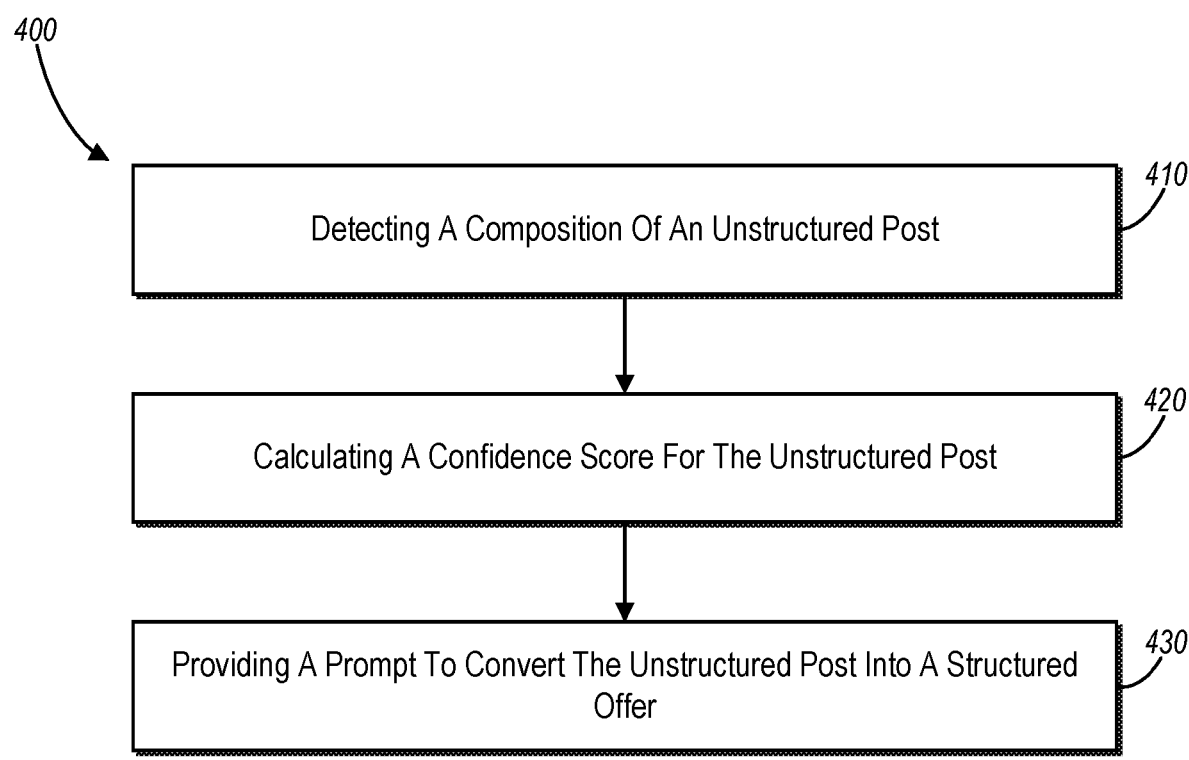
FIG. 4 illustrates a flowchart of a series of acts in a method of identifying an offer in a networking system post in accordance with one or more embodiments.

FIG. 4 illustrates a flowchart of one example method 400 of identifying offers in networking system posts. The method 400 includes an act 410 of detecting a composition of an unstructured post. In particular, the act 410 involves detecting a composition of an unstructured social networking post. For example, in one or more embodiments, detecting the composition of the unstructured social networking post includes detecting the composition of the unstructured social networking post by a page administrator associated with a merchant's profile page on the networking system.

Additionally, the method 400 includes an act 420 of calculating a confidence score for the unstructured post. In particular, the act 420 involves analyzing the unstructured social networking post to generate a confidence score indicating a confidence that the unstructured social networking post includes an offer. Additionally, in one or more embodiments, the method 400 includes training a machine learning model for calculating confidence scores, wherein analyzing the unstructured social networking post to generate the confidence score comprises utilizing the trained machine learning model to generate the confidence score for the unstructured networking system post.

The method 400 also includes an act of determining whether the confidence score satisfies a predetermined threshold. For example, the method 400 can include an act of selecting the predetermined threshold based on a history of a page administrator or a merchant associated with the unstructured social networking post. In at least one embodiment, selecting the predetermined threshold based on the history of the page administrator or the merchant associated with the unstructured social networking post includes: determining whether the page administrator has declined a prompt to convert an unstructured social networking post into a structured offer post in the past; based on a determination that the page administrator has declined a prompt to convert an unstructured social networking post into a structured offer post in the past, selecting a relatively higher threshold value; and based on a determination that the page administrator has not declined a prompt to convert an unstructured social networking post into a structured offer post in the past, selecting a relatively lower threshold value. Alternatively, selecting the predetermined threshold based on the history of the page administrator or the merchant associated with the unstructured social networking post can include: determining whether the page administrator has created a structured offer in the past; based on a determination that the page administrator has created a structured offer in the past, selecting a relatively higher threshold value; and based on a determination that the page administrator has not created a structured offer in the past, selecting a relatively lower threshold value.

The method 400 also includes an act 430 of providing a prompt to convert the unstructured post into a structured offer. In particular, the act 430 involves providing, based on the generated confidence score, a prompt to convert the unstructured networking system post into a structured offer. In one or more embodiments, the method 400 further includes customizing the prompt based on the history of the page administrator or the merchant associated with the unstructured social networking post. For example, in one embodiment, customizing the prompt comprises at least one of customizing contents of the prompt, customizing an appearance of the prompt, customizing a location of the prompt, or customizing a timing of the prompt.

Additionally, the method 400 can include acts of receiving a request to convert the unstructured social networking post into a structured offer, extracting information from the unstructured networking system post, and pre-populating one or more fields of the structured offer with the extracted information. Additionally or alternatively, the method 400 can include acts of receiving a request to convert the unstructured social networking post into a structured offer, generating a structured offer based on the unstructured social networking post in response to the received request, and replacing, within the networking system, the unstructured networking system post with the generated structured offer. Finally, in at least one embodiment, the method 400 also includes an act of providing insights to a page administrator associated with the structured offer, the insights comprising information regarding at least one of a number of users that received the structured offer, a number of times the structured offer has been redeemed, or a conversion rate associated with the structured offer.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 5:
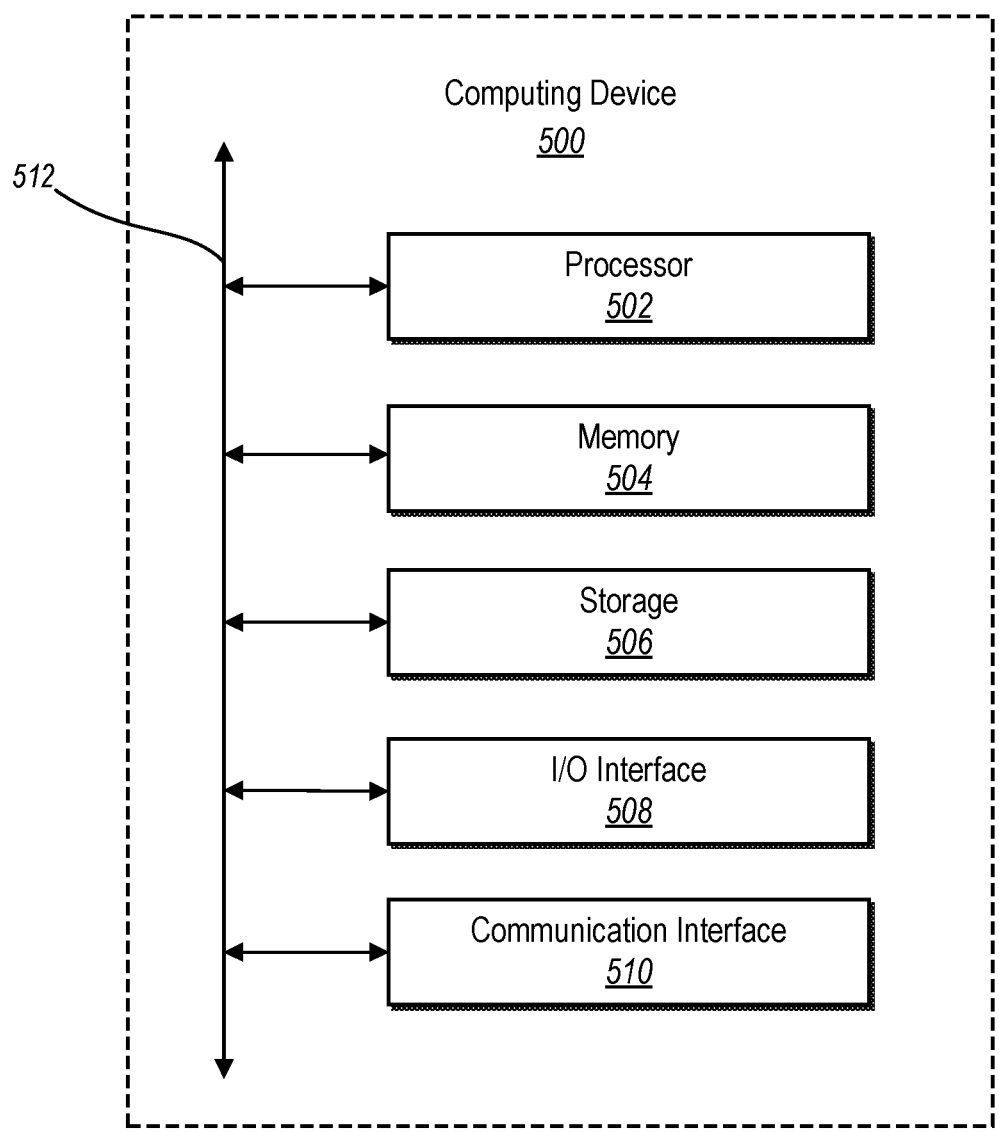
FIG. 5 illustrates a block diagram of an exemplary computing device in accordance with one or more embodiments.

FIG. 5 illustrates a block diagram of exemplary computing device 500 that may be configured to perform one or more of the processes described above. One will appreciate that one or more computing devices such as the computing device 500 may implement the offer management system 100. As shown by FIG. 5, the computing device 500 can comprise a processor 502, a memory 504, a storage device 506, an I/O interface 508, and a communication interface 510, which may be communicatively coupled by way of a communication infrastructure 512. While an exemplary computing device 500 is shown in FIG. 5, the components illustrated in FIG. 5 are not intended to be limiting. Additional or alternative components may be used in other embodiments. Furthermore, in certain embodiments, the computing device 500 can include fewer components than those shown in FIG. 5. Components of the computing device 500 shown in FIG. 5 will now be described in additional detail.

In one or more embodiments, the processor 502 includes hardware for executing instructions, such as those making up a computer program. As an example and not by way of limitation, to execute instructions, the processor 502 may retrieve (or fetch) the instructions from an internal register, an internal cache, the memory 504, or the storage device 506 and decode and execute them. In one or more embodiments, the processor 502 may include one or more internal caches for data, instructions, or addresses. As an example and not by way of limitation, the processor 502 may include one or more instruction caches, one or more data caches, and one or more translation lookaside buffers (TLBs). Instructions in the instruction caches may be copies of instructions in the memory 504 or the storage device 506.

The memory 504 may be used for storing data, metadata, and programs for execution by the processor(s). The memory 504 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 504 may be internal or distributed memory.

The storage device 506 includes storage for storing data or instructions. As an example and not by way of limitation, storage device 506 can comprise a non-transitory storage medium described above. The storage device 506 may include a hard disk drive (HDD), a floppy disk drive, flash memory, an optical disc, a magneto-optical disc, magnetic tape, or a Universal Serial Bus (USB) drive or a combination of two or more of these. The storage device 506 may include removable or non-removable (or fixed) media, where appropriate. The storage device 506 may be internal or external to the computing device 500. In one or more embodiments, the storage device 506 is non-volatile, solid-state memory. In other embodiments, the storage device 506 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 508 allows a user to provide input to, receive output from, and otherwise transfer data to and receive data from computing device 500. The I/O interface 508 may include a mouse, a keypad or a keyboard, a touch screen, a camera, an optical scanner, network interface, modem, other known I/O devices or a combination of such I/O interfaces. The I/O interface 508 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 508 is configured to provide graphical data to a display for presentation to a user. The graphical data may be representative of one or more graphical user interfaces and/or any other graphical content as may serve a particular implementation.

The communication interface 510 can include hardware, software, or both. In any event, the communication interface 510 can provide one or more interfaces for communication (such as, for example, packet-based communication) between the computing device 500 and one or more other computing devices or networks. As an example and not by way of limitation, the communication interface 510 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 510 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 510 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 510 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 512 may include hardware, software, or both that couples components of the computing device 500 to each other. As an example and not by way of limitation, the communication infrastructure 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the offer management system 100 can comprise a networking system. A networking system may enable its users (such as persons or organizations) to interact with the system and with each other. The networking system may, with input from a user, create and store in the networking system a user profile associated with the user. The user profile may include demographic information, communication-channel information, and information on personal interests of the user. The networking system may also, with input from a user, create and store a record of relationships of the user with other users of the networking system, as well as provide services (e.g., posts, photo-sharing, event organization, messaging, games, or advertisements) to facilitate social interaction between or among users.

The networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the networking system. A user may be an individual (human user), an entity (e.g., an enterprise, business, or third party application), or a group (e.g., of individuals or entities). A user node corresponding to a user may comprise information provided by the user and information gathered by various systems, including the networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the networking system may construct a web page (or a structured document) of a concept node (e.g., a restaurant, a celebrity), incorporating one or more selectable option or selectable elements (e.g., "like", "check in") in the web page. A user can access the page using a web browser hosted by the user's client device and select a selectable option or selectable element, causing the client device to transmit to the networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A networking system may support a variety of applications, such as photo sharing, on-line calendars and events, gaming, instant messaging, and advertising. For example, the networking system may also include media sharing capabilities. Also, the networking system may allow users to post photographs and other multimedia content items to a user's profile page (typically known as "wall posts" or "timeline posts") or in a photo album, both of which may be accessible to other users of the networking system depending upon the user's configured privacy settings. The networking system may also allow users to configure events. For example, a first user may configure an event with attributes including time and date of the event, location of the event and other users invited to the event. The invited users may receive invitations to the event and respond (such as by accepting the invitation or declining it). Furthermore, the networking system may allow users to maintain a personal calendar. Similarly to events, the calendar entries may include times, dates, locations and identities of other users.

Figure 6:
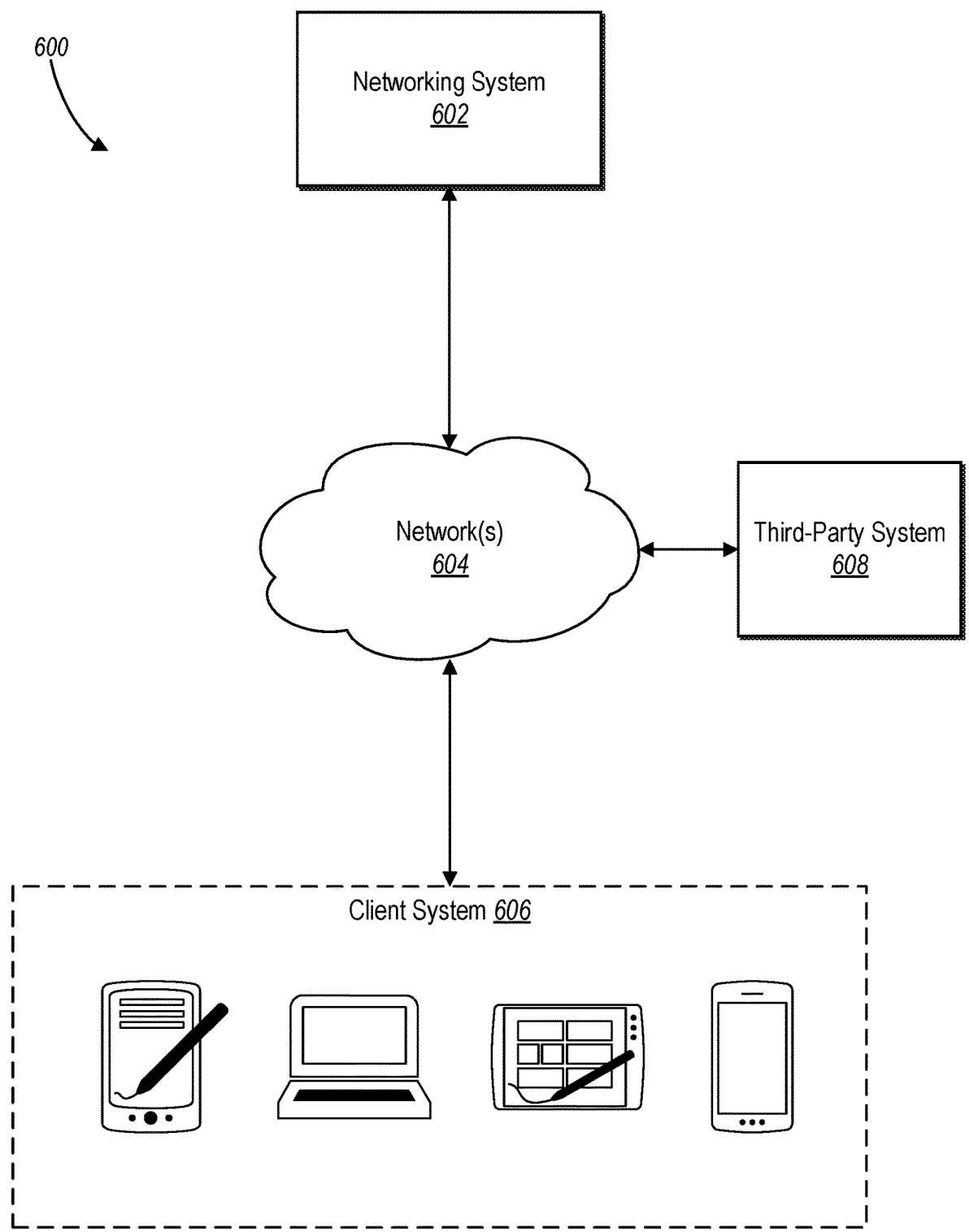
FIG. 6 is an example network environment of a networking system in accordance with one or more embodiments.

FIG. 6 illustrates an example network environment 600 of a networking system. Network environment 600 includes a client device 606, a networking system 602, and a third-party system 608 connected to each other by a network 604.

Although FIG. 6 illustrates a particular arrangement of client device 606, networking system 602, third-party system 608, and network 604, this disclosure contemplates any suitable arrangement of client device 606, networking system 602, third-party system 608, and network 604. As an example and not by way of limitation, two or more of client device 606, networking system 602, and third-party system 608 may be connected to each other directly, bypassing network 604. As another example, two or more of client device 606, networking system 602, and third-party system 608 may be physically or logically co-located with each other in whole or in part. Moreover, although FIG. 6 illustrates a particular number of client devices 606, networking systems 602, third-party systems 608, and networks 604, this disclosure contemplates any suitable number of client devices 606, networking systems 602, third-party systems 608, and networks 604. As an example and not by way of limitation, network environment 600 may include multiple client device 606, networking systems 602, third-party systems 608, and networks 604.

This disclosure contemplates any suitable network 604. As an example and not by way of limitation, one or more portions of network 604 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 604 may include one or more networks 604.

Links may connect client device 606, networking system 602, and third-party system 608 to communication network 604 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 600. One or more first links may differ in one or more respects from one or more second links.

In particular embodiments, client device 606 may be an electronic device including hardware, software, or embedded logic components or a combination of two or more such components and capable of carrying out the appropriate functionalities implemented or supported by client device 606. As an example and not by way of limitation, a client device 606 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client devices 606. A client device 606 may enable a network user at client device 606 to access network 604. A client device 606 may enable its user to communicate with other users at other client devices 606.

In particular embodiments, client device 606 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 606 may enter a Uniform Resource Locator (URL) or other address directing the web browser to a particular server (such as server, or a server associated with a third-party system 608), and the web browser may generate a Hyper Text Transfer Protocol (HTTP) request and communicate the HTTP request to server. The server may accept the HTTP request and communicate to client device 606 one or more Hyper Text Markup Language (HTML) files responsive to the HTTP request. Client device 606 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, networking system 602 may be a network-addressable computing system that can host an online social network. Networking system 602 may generate, store, receive, and send social-networking data, such as, for example, user-profile data, concept-profile data, social-graph information, or other suitable data related to the online social network. Networking system 602 may be accessed by the other components of network environment 600 either directly or via network 604. In particular embodiments, networking system 602 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, networking system 602 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 606, a networking system 602, or a third-party system 608 to manage, retrieve, modify, add, or delete, the information stored in data store.

In particular embodiments, networking system 602 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Networking system 602 may provide users of the online social network the ability to communicate and interact with other users. In particular embodiments, users may join the online social network via networking system 602 and then add connections (e.g., relationships) to a number of other users of networking system 602 whom they want to be connected to. Herein, the term "friend" may refer to any other user of networking system 602 with whom a user has formed a connection, association, or relationship via networking system 602.

In particular embodiments, networking system 602 may provide users with the ability to take actions on various types of items or objects, supported by networking system 602. As an example and not by way of limitation, the items and objects may include groups or social networks to which users of networking system 602 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in networking system 602 or by an external system of third-party system 608, which is separate from networking system 602 and coupled to networking system 602 via a network 604.

In particular embodiments, networking system 602 may be capable of linking a variety of entities. As an example and not by way of limitation, networking system 602 may enable users to interact with each other as well as receive content from third-party systems 608 or other entities, or to allow users to interact with these entities through an application programming interfaces (API) or other communication channels.

In particular embodiments, a third-party system 608 may include one or more types of servers, one or more data stores, one or more interfaces, including but not limited to APIs, one or more web services, one or more content sources, one or more networks, or any other suitable components, e.g., that servers may communicate with. A third-party system 608 may be operated by a different entity from an entity operating networking system 602. In particular embodiments, however, networking system 602 and third-party systems 608 may operate in conjunction with each other to provide social-networking services to users of networking system 602 or third-party systems 608. In this sense, networking system 602 may provide a platform, or backbone, which other systems, such as third-party systems 608, may use to provide social-networking services and functionality to users across the Internet.

In particular embodiments, a third-party system 608 may include a third-party content object provider. A third-party content object provider may include one or more sources of content objects, which may be communicated to a client device 606. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, networking system 602 also includes user-generated content objects, which may enhance a user's interactions with networking system 602. User-generated content may include anything a user can add, upload, send, or "post" to networking system 602. As an example and not by way of limitation, a user communicates posts to networking system 602 from a client device 606. Posts may include data such as status updates or other textual data, location information, photos, videos, links, music or other similar data or media. Content may also be added to networking system 602 by a third-party through a "communication channel," such as a newsfeed or stream.

In particular embodiments, networking system 602 may include a variety of servers, sub-systems, programs, modules, logs, and data stores. In particular embodiments, networking system 602 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Networking system 602 may also include suitable components such as network interfaces, security mechanisms, load balancers, failover servers, management-and-network-operations consoles, other suitable components, or any suitable combination thereof. In particular embodiments, networking system 602 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking networking system 602 to one or more client devices 606 or one or more third-party system 608 via network 604. The web server may include a mail server or other messaging functionality for receiving and routing messages between networking system 602 and one or more client devices 606. An API-request server may allow a third-party system 608 to access information from networking system 602 by calling one or more APIs. An action logger may be used to receive communications from a web server about a user's actions on or off networking system 602. In conjunction with the action log, a third-party-content-object log may be maintained of user exposures to third-party-content objects. A notification controller may provide information regarding content objects to a client device 606. Information may be pushed to a client device 606 as notifications, or information may be pulled from client device 606 responsive to a request received from client device 606. Authorization servers may be used to enforce one or more privacy settings of the users of networking system 602. A privacy setting of a user determines how particular information associated with a user can be shared. The authorization server may allow users to opt in to or opt out of having their actions logged by networking system 602 or shared with other systems (e.g., third-party system 608), such as, for example, by setting appropriate privacy settings. Third-party-content-object stores may be used to store content objects received from third parties, such as a third-party system 608. Location stores may be used for storing location information received from client devices 606 associated with users. Advertisement-pricing modules may combine social information, the current time, location information, or other suitable information to provide relevant advertisements, in the form of notifications, to a user.

Figure 7:
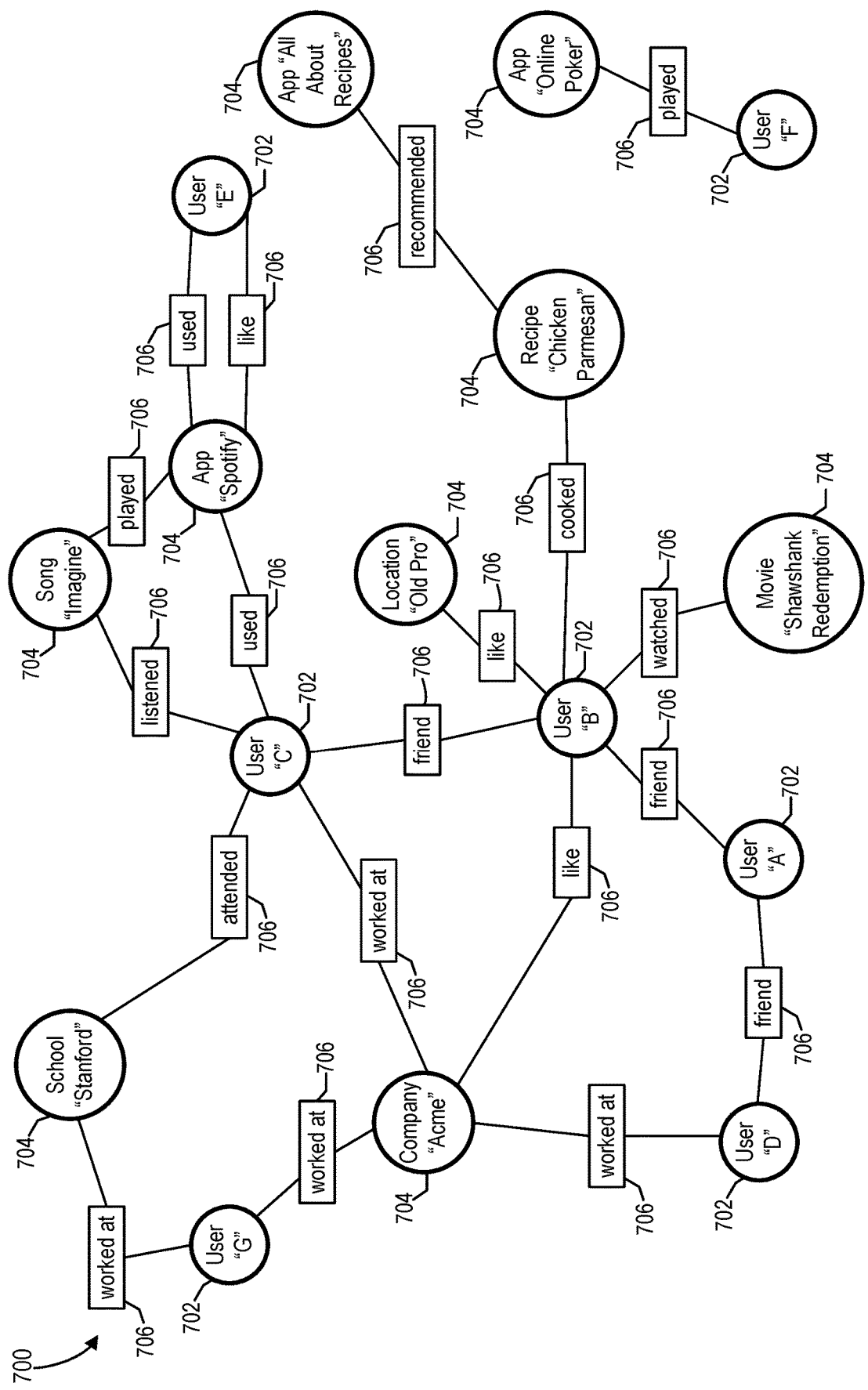
FIG. 7 illustrates a social graph in accordance with one or more embodiments.

FIG. 7 illustrates example social graph 700. In particular embodiments, networking system 602 may store one or more social graphs 700 in one or more data stores. In particular embodiments, social graph 700 may include multiple nodes—which may include multiple user nodes 702 or multiple concept nodes 704—and multiple edges 706 connecting the nodes. Example social graph 700 illustrated in FIG. 7 is shown, for didactic purposes, in a two-dimensional visual map representation. In particular embodiments, a networking system 602, client device 606, or third-party system 608 may access social graph 700 and related social-graph information for suitable applications. The nodes and edges of social graph 700 may be stored as data objects, for example, in a data store (such as a social-graph database). Such a data store may include one or more searchable or query able indexes of nodes or edges of social graph 700.

In particular embodiments, a user node 702 may correspond to a user of networking system 602. As an example and not by way of limitation, a user may be an individual (human user), an entity (e.g., an enterprise, business, or third-party application), or a group (e.g., of individuals or entities) that interacts or communicates with or over networking system 602. In particular embodiments, when a user registers for an account with networking system 602, networking system 602 may create a user node 702 corresponding to the user, and store the user node 702 in one or more data stores. Users and user nodes 702 described herein may, where appropriate, refer to registered users and user nodes 702 associated with registered users. In addition or as an alternative, users and user nodes 702 described herein may, where appropriate, refer to users that have not registered with networking system 602. In particular embodiments, a user node 702 may be associated with information provided by a user or information gathered by various systems, including networking system 602. As an example and not by way of limitation, a user may provide his or her name, profile picture, contact information, birth date, sex, marital status, family status, employment, education background, preferences, interests, or other demographic information. In particular embodiments, a user node 702 may be associated with one or more data objects corresponding to information associated with a user. In particular embodiments, a user node 702 may correspond to one or more webpages.

In particular embodiments, a concept node 704 may correspond to a concept. As an example and not by way of limitation, a concept may correspond to a place (such as, for example, a movie theater, restaurant, landmark, or city); a website (such as, for example, a website associated with networking system 602 or a third-party website associated with a web-application server); an entity (such as, for example, a person, business, group, sports team, or celebrity); a resource (such as, for example, an audio file, video file, digital photo, text file, structured document, or application) which may be located within networking system 602 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 704 may be associated with information of a concept provided by a user or information gathered by various systems, including networking system 602. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 704 may be associated with one or more data objects corresponding to information associated with concept node 704. In particular embodiments, a concept node 704 may correspond to one or more webpages.

In particular embodiments, a node in social graph 700 may represent or be represented by a webpage (which may be referred to as a "profile page"). Profile pages may be hosted by or accessible to networking system 602. Profile pages may also be hosted on third-party websites associated with a third-party system 608. As an example and not by way of limitation, a profile page corresponding to a particular external webpage may be the particular external webpage and the profile page may correspond to a particular concept node 704. Profile pages may be viewable by all or a selected subset of other users. As an example and not by way of limitation, a user node 702 may have a corresponding user-profile page in which the corresponding user may add content, make declarations, or otherwise express himself or herself. As another example and not by way of limitation, a concept node 704 may have a corresponding concept-profile page in which one or more users may add content, make declarations, or express themselves, particularly in relation to the concept corresponding to concept node 704.

In particular embodiments, a concept node 704 may represent a third-party webpage or resource hosted by a third-party system 608. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 606 to send to networking system 602 a message indicating the user's action. In response to the message, networking system 602 may create an edge (e.g., an "eat" edge) between a user node 702 corresponding to the user and a concept node 704 corresponding to the third-party webpage or resource and store edge 706 in one or more data stores.

In particular embodiments, a pair of nodes in social graph 700 may be connected to each other by one or more edges 706. An edge 706 connecting a pair of nodes may represent a relationship between the pair of nodes. In particular embodiments, an edge 706 may include or represent one or more data objects or attributes corresponding to the relationship between a pair of nodes. As an example and not by way of limitation, a first user may indicate that a second user is a "friend" of the first user. In response to this indication, networking system 602 may send a "friend request" to the second user. If the second user confirms the "friend request,"

networking system 602 may create an edge 706 connecting the first user's user node 702 to the second user's user node 702 in social graph 700 and store edge 706 as social-graph information in one or more of data stores. In the example of FIG. 7, social graph 700 includes an edge 706 indicating a friend relation between user nodes 702 of user "A" and user "B" and an edge indicating a friend relation between user nodes 702 of user "C" and user "B." Although this disclosure describes or illustrates particular edges 706 with particular attributes connecting particular user nodes 702, this disclosure contemplates any suitable edges 706 with any suitable attributes connecting user nodes 702. As an example and not by way of limitation, an edge 706 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 700 by one or more edges 706.

In particular embodiments, an edge 706 between a user node 702 and a concept node 704 may represent a particular action or activity performed by a user associated with user node 702 toward a concept associated with a concept node 704. As an example and not by way of limitation, as illustrated in FIG. 7, a user may "like," "attended," "played," "listened," "cooked," "worked at," or "watched" a concept, each of which may correspond to an edge type or subtype. A concept-profile page corresponding to a concept node 704 may include, for example, a selectable "check in" icon (such as, for example, a clickable "check in" icon) or a selectable "add to favorites" icon. Similarly, after a user clicks these icons, networking system 602 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, networking system 602 may create a "listened" edge 706 and a "used" edge (as illustrated in FIG. 7) between user nodes 702 corresponding to the user and concept nodes 704 corresponding to the song and application to indicate that the user listened to the song and used the application. Moreover, networking system 602 may create a "played" edge 706 (as illustrated in FIG. 7) between concept nodes 704 corresponding to the song and the application to indicate that the particular song was played by the particular application. In this case, "played" edge 706 corresponds to an action performed by an external application (SPOTIFY) on an external audio file (the song "Imagine"). Although this disclosure describes particular edges 706 with particular attributes connecting user nodes 702 and concept nodes 704, this disclosure contemplates any suitable edges 706 with any suitable attributes connecting user nodes 702 and concept nodes 704. Moreover, although this disclosure describes edges between a user node 702 and a concept node 704 representing a single relationship, this disclosure contemplates edges between a user node 702 and a concept node 704 representing one or more relationships. As an example and not by way of limitation, an edge 706 may represent both that a user likes and has used at a particular concept. Alternatively, another edge 706 may represent each type of relationship (or multiples of a single relationship) between a user node 702 and a concept node 704 (as illustrated in FIG. 7 between user node 702 for user "E" and concept node 704 for "SPOTIFY").

In particular embodiments, networking system 602 may create an edge 706 between a user node 702 and a concept node 704 in social graph 700. As an example and not by way of limitation, a user viewing a concept-profile page (such as, for example, by using a web browser or a special-purpose application hosted by the user's client device 606) may indicate that he or she likes the concept represented by the concept node 704 by clicking or selecting a "Like" icon, which may cause the user's client device 606 to send to networking system 602 a message indicating the user's liking of the concept associated with the concept-profile page. In response to the message, networking system 602 may create an edge 706 between user node 702 associated with the user and concept node 704, as illustrated by "like" edge 706 between the user and concept node 704. In particular embodiments, networking system 602 may store an edge 706 in one or more data stores. In particular embodiments, an edge 706 may be automatically formed by networking system 602 in response to a particular user action. As an example and not by way of limitation, if a first user uploads a picture, watches a movie, or listens to a song, an edge 706 may be formed between user node 702 corresponding to the first user and concept nodes 704 corresponding to those concepts. Although this disclosure describes forming particular edges 706 in particular manners, this disclosure contemplates forming any suitable edges 706 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on networking system 602). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, networking system 602 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through networking system 602) or RSVP (e.g., through networking system 602) to an event associated with the advertisement. In addition or as an alternative, an advertisement may include social-networking-system context directed to the user. As an example and not by way of limitation, an advertisement may display information about a friend of the user within networking system 602 who has taken an action associated with the subject matter of the advertisement.

In particular embodiments, networking system 602 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 608 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, networking system 602 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part based on the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, networking system 602 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the networking system 602 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, networking system 602 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, networking system 602 may calculate a coefficient based on a user's actions. Networking system 602 may monitor such actions on the online social network, on a third-party system 608, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, networking system 602 may calculate a coefficient based on the user's actions with particular types of content. The content may be associated with the online social network, a third-party system 608, or another suitable system. The content may include users, profile pages, posts, news stories, headlines, instant messages, chat room conversations, emails, advertisements, pictures, video, music, other suitable objects, or any combination thereof. Networking system 602 may analyze a user's actions to determine whether one or more of the actions indicate an affinity for subject matter, content, other users, and so forth. As an example and not by way of limitation, if a user may make frequently posts content related to "coffee" or variants thereof, networking system 602 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, networking system 602 may calculate a coefficient based on the type of relationship between particular objects. Referencing the social graph 700, networking system 602 may analyze the number and/or type of edges 706 connecting particular user nodes 702 and concept nodes 704 when calculating a coefficient. As an example and not by way of limitation, user nodes 702 that are connected by a spouse-type edge (representing that the two users are married) may be assigned a higher coefficient than a user node 702 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, networking system 602 may determine that the user has a higher coefficient with respect to the first photo than the second photo because having a tagged-in-type relationship with content may be assigned a higher weight and/or rating than having a like-type relationship with content. In particular embodiments, networking system 602 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, networking system 602 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 700. As an example and not by way of limitation, social-graph entities that are closer in the social graph 700 (i.e., fewer degrees of separation) may have a higher coefficient than entities that are further apart in the social graph 700.

In particular embodiments, networking system 602 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device 606 of the user). A first user may be more interested in other users or concepts that are closer to the first user. As an example and not by way of limitation, if a user is one mile from an airport and two miles from a gas station, networking system 602 may determine that the user has a higher coefficient for the airport than the gas station based on the proximity of the airport to the user.

In particular embodiments, networking system 602 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, networking system 602 may provide information that is relevant to user's interests and current circumstances, increasing the likelihood that they will find such information of interest. In particular embodiments, networking system 602 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, networking system 602 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, networking system 602 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 608 (e.g., via an API or other communication channel), or from another suitable system. In response to the request, networking system 602 may calculate the coefficient (or access the coefficient information if it has previously been calculated and stored). In particular embodiments, networking system 602 may measure an affinity with respect to a particular process. Different processes (both internal and external to the online social network) may request a coefficient for a particular object or set of objects. Networking system 602 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 704 corresponding to a particular photo may have a privacy setting specifying that the photo may only be accessed by users tagged in the photo and their friends. In particular embodiments, privacy settings may allow users to opt in or opt out of having their actions logged by networking system 602 or shared with other systems (e.g., third-party system 608). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 608, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, networking system 602 may send a request to the data store for the object. The request may identify the user associated with the request and may only be sent to the user (or a client device 606 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
   detecting, by one or more computing devices of a networking system, a composition of an unstructured networking system post;
   analyzing, by the one or more computing devices, the unstructured networking system post to generate a confidence score indicating a confidence that the unstructured networking system post includes an offer;
   determining a dynamic threshold amount representing a likelihood that an author of the unstructured networking system post will convert the unstructured networking system post into a structured offer;
   generating, based on how close the generated confidence score is to the dynamic threshold amount, a customized prompt to convert the unstructured networking system post into a structured offer by:
   determining a distance between the generated confidence score and the dynamic threshold amount, and generating the customized prompt such that a display size of the customized prompt is based on the determined distance; and providing the customized prompt.

2. The method as recited in claim 1, further comprising:
training a machine learning model for calculating confidence scores;
wherein analyzing the unstructured social networking post to generate the confidence score comprises utilizing the trained machine learning model to generate the confidence score for the unstructured networking system post.

3. The method as recited in claim 2, wherein determining the dynamic threshold amount is based on a history of a page administrator or a merchant associated with the unstructured networking system post.

4. The method as recited in claim 3, wherein determining the dynamic threshold amount based on the history of the page administrator or the merchant associated with the unstructured networking system post comprises:
determining whether the page administrator has declined a prompt to convert an unstructured networking system post into a structured offer post in the past;
based on a determination that the page administrator has declined a prompt to convert an unstructured networking system post into a structured offer post in the past, selecting a relatively higher dynamic threshold amount; and
based on a determination that the page administrator has not declined a prompt to convert an unstructured networking system post into a structured offer post in the past, selecting a relatively lower dynamic threshold amount.

5. The method as recited in claim 3, wherein determining the dynamic threshold amount based on the history of the page administrator or the merchant associated with the unstructured networking system post comprises:
determining whether the page administrator has created a structured offer in the past;
based on a determination that the page administrator has created a structured offer in the past, selecting a relatively higher dynamic threshold amount; and
based on a determination that the page administrator has not created a structured offer in the past, selecting a relatively lower dynamic threshold amount.

6. The method as recited in claim 5, wherein generating the customized prompt further comprises at least one of customizing contents of the prompt, customizing an appearance of the prompt, customizing a location of the prompt, or customizing a timing of the prompt.

7. The method as recited in claim 1, further comprising:
receiving a request to convert the unstructured networking system post into a structured offer;
extracting information from the unstructured networking system post; and
pre-populating one or more fields of the structured offer with the extracted information.

8. The method as recited in claim 1, further comprising:
receiving a request to convert the unstructured networking system post into a structured offer;
generating a structured offer based on the unstructured networking system post in response to the received request; and
replacing, within the networking system, the unstructured networking system post with the generated structured offer.

9. The method as recited in claim 8, further comprising providing insights to a page administrator associated with the structured offer, the insights comprising information regarding at least one of a number of users that received the structured offer, a number of times the structured offer has been redeemed, or a conversion rate associated with the structured offer.

10. The method as recited in claim 1, wherein detecting the composition of the unstructured social networking post comprises detecting the composition of the unstructured networking system post by a page administrator associated with a merchant's profile page on the networking system.

11. A system comprising:
at least one processor; and
at least one non-transitory computer-readable storage medium storing instructions thereon that, when executed by the at least one processor, cause the system to:
detect a composition of an unstructured networking system communication;
analyze the unstructured networking system communication to generate a confidence score indicating a confidence that the unstructured networking system communication includes an offer;
determine a dynamic threshold amount representing a likelihood that an author of the unstructured networking system communication will convert the unstructured networking system communication into a structured offer;
generate, based on how close the generated confidence score is to the dynamic threshold amount, a customized prompt to convert the unstructured networking system communication into a structured offer by:
determining a distance between the generated confidence score and the dynamic threshold amount, and
generating the customized prompt such that a display size of the customized prompt is based on the determined distance; and
provide the customized prompt.

12. The system as recited in claim 11, further comprising instructions thereon that, when executed by the at least one processor, cause the system to:
train a machine learning model for calculating confidence scores based on a training data set comprising a plurality of unstructured networking system communications that include offers,
wherein analyzing the unstructured networking system communication to generate the confidence score comprises utilizing the trained machine learning model to generate the confidence score for the unstructured networking system communication.

13. The system as recited in claim 12, wherein determining the dynamic threshold amount is based on a history of a page administrator or a merchant associated with the unstructured networking system communication.

14. The system as recited in claim 13, wherein determining the dynamic threshold amount based on the history of the page administrator or the merchant associated with the unstructured networking system communication comprises:
determining whether the page administrator has created a structured offer in the past;
based on a determination that the page administrator has created a structured offer in the past, selecting a relatively higher dynamic threshold amount; and
based on a determination that the page administrator has not created a structured offer in the past, selecting a relatively lower dynamic threshold amount.

15. The system as recited in claim 14, further comprising instructions thereon that, when executed by the at least one processor, cause the system to provide insights to a page administrator associated with the structured offer, the insights comprising information regarding at least one of a number of users that received the structured offer, a number of times the structured offer has been redeemed, or a conversion rate associated with the structured offer.

16. The system as recited in claim 11, further comprising instructions thereon that, when executed by the at least one processor, cause the system to:
receive a request to convert the unstructured networking system communication into a structured offer;
extract information from the unstructured networking system communication; and
pre-populate one or more fields of the structured offer with the extracted information.

17. The system as recited in claim 11, further comprising instructions thereon that, when executed by the at least one processor, cause the system to:
receive a request to convert the unstructured networking system communication into a structured offer;
generate a structured offer based on the unstructured networking system communication in response to the received request; and
replace, within the networking system, the unstructured networking system communication with the generated structured offer.

18. The system as recited in claim 17, further comprising instructions thereon that, when executed by the at least one processor, cause the system to provide insights to a page administrator associated with the structured offer, the insights comprising information regarding at least one of a number of users that received the structured offer, a number of times the structured offer has been redeemed, or a conversion rate associated with the structured offer.

19. The system as recited in claim 18, wherein detecting the composition of the unstructured social networking communication comprises detecting the composition of the unstructured networking system communication by a page administrator associated with a merchant's profile page on the networking system.

20. A non-transitory computer-readable medium storing instructions thereon that, when executed by at least one processor, cause a computer system to:
detect a composition of an unstructured networking system post;
analyze the unstructured networking system post to generate a confidence score indicating a confidence that the unstructured networking system post includes an offer;
determine a dynamic threshold amount representing a likelihood that an author of the unstructured networking system post will convert the unstructured networking system post into a structured offer;
generate, based on how close the generated confidence score is to the dynamic threshold amount, a customized prompt to convert the unstructured networking system post into a structured offer by:
determining a distance between the generated confidence score and the dynamic threshold amount, and
generating the customized prompt such that a display size of the customized prompt is based on the determined distance; and
provide the customized prompt.

\* \* \* \* \*